United States Patent
Murasaki et al.

(10) Patent No.: US 10,426,231 B2
(45) Date of Patent: Oct. 1, 2019

(54) MOLDED SURFACE FASTENER, CUSHION BODY, CUSHION BODY MANUFACTURING METHOD, AND MOLDING DIE

(71) Applicant: YKK Corporation, Tokyo (JP)

(72) Inventors: Ryuichi Murasaki, Tokyo (JP); Toru Yamamoto, Tokyo (JP); Yoshitomo Iyoda, Tokyo (JP); Genta Matsumura, Tokyo (JP)

(73) Assignee: YKK Corporation (JP)

( * ) Notice: Subject to any disclaimer, the term of this patent is extended or adjusted under 35 U.S.C. 154(b) by 504 days.

(21) Appl. No.: 15/119,208

(22) PCT Filed: Mar. 13, 2014

(86) PCT No.: PCT/JP2014/056754
§ 371 (c)(1),
(2) Date: Aug. 16, 2016

(87) PCT Pub. No.: WO2015/136674
PCT Pub. Date: Sep. 17, 2015

(65) Prior Publication Data
US 2017/0042296 A1  Feb. 16, 2017

(51) Int. Cl.
*B60N 2/58* (2006.01)
*B60N 2/70* (2006.01)
*A44B 18/00* (2006.01)

(52) U.S. Cl.
CPC ........ *A44B 18/0076* (2013.01); *A44B 18/008* (2013.01); *A44B 18/0049* (2013.01);
(Continued)

(58) Field of Classification Search
CPC .. B60N 2/5825; B60N 2/5833; B60N 2/5841; B60N 2/7017; B60N 2/5891;
(Continued)

(56) References Cited

U.S. PATENT DOCUMENTS 5,005,242 A * 4/1991 Kennedy .............. B60N 2/5825
24/444
5,101,539 A * 4/1992 Kennedy .............. B60N 2/5833
24/442
(Continued)

FOREIGN PATENT DOCUMENTS

CA         2407762 A1 * 11/2001 ......... A44B 18/0049
DE  202016005135 U1 * 11/2016 ........... B60N 2/5833
(Continued)

OTHER PUBLICATIONS

International Search Report, PCT International Application No. PCT/JP2014/056754, dated Jun. 17, 2014.
(Continued)

*Primary Examiner* — Ryan D Kwiecinski
(74) *Attorney, Agent, or Firm* — Kilpatrick Townsend & Stockton LLP

(57) ABSTRACT

A molded surface fastener comprises at least one surface fastener portion and a foldable piece portion that extends from the surface fastener portion. At least a part of the foldable piece portion has flexibility. The surface fastener portion has a pair of first barrier portions and a second barrier portion. A cushion body with the molded surface fastener anchored to a prescribed position while a plurality of engaging elements are in an exposed state can be stably manufactured by way of foam molding the cushion body using the molded surface fastener.

17 Claims, 22 Drawing Sheets

(52) U.S. Cl.
CPC ........ *A44B 18/0061* (2013.01); *B60N 2/5825* (2013.01); *B60N 2/5833* (2013.01); *B60N 2/5891* (2013.01); *B60N 2/7017* (2013.01)

(58) Field of Classification Search
CPC .............. B60N 2/5816; A44B 18/0015; A44B 18/0049; A44B 18/0061; A44B 18/0073; A44B 18/0076
See application file for complete search history.

(56) References Cited

U.S. PATENT DOCUMENTS

| | | | |
|---|---|---|---|
| 5,604,963 A | 2/1997 | Akeno | |
| 5,657,517 A | 8/1997 | Akeno et al. | |
| 5,678,286 A | 10/1997 | Murasaki et al. | |
| 5,913,482 A | 6/1999 | Akeno et al. | |
| 6,054,091 A | 4/2000 | Miller et al. | |
| 6,720,059 B2 * | 4/2004 | Fujisawa | A44B 18/0046 24/442 |
| 9,783,090 B2 * | 10/2017 | Yoshida | B60N 2/5833 |
| 9,888,746 B2 * | 2/2018 | Murasaki | A44B 18/0076 |
| 2002/0023322 A1 * | 2/2002 | Murasaki | A44B 18/0076 24/452 |
| 2002/0164449 A1 * | 11/2002 | Fujisawa | A44B 18/0049 428/99 |
| 2002/0164451 A1 * | 11/2002 | Fujisawa | A44B 18/0046 428/100 |
| 2003/0214068 A1 | 11/2003 | Fujisawa et al. | |
| 2006/0110572 A1 * | 5/2006 | Herrero | A44B 18/0049 428/100 |
| 2009/0276986 A1 * | 11/2009 | Janzen | A44B 18/0076 24/442 |
| 2011/0265293 A1 | 11/2011 | Idrizovic et al. | |
| 2012/0011685 A1 * | 1/2012 | Rocha | A44B 18/0073 24/449 |
| 2013/0055534 A1 | 3/2013 | Cheng | |
| 2014/0137377 A1 | 5/2014 | Cheng et al. | |
| 2015/0335106 A1 * | 11/2015 | Okuda | A44B 18/0076 24/443 |
| 2016/0318429 A1 * | 11/2016 | Yoshida | B60N 2/5833 |
| 2017/0008435 A1 | 1/2017 | Murasaki et al. | |
| 2017/0150788 A1 * | 6/2017 | Imai | A44B 18/0049 |
| 2017/0240081 A1 * | 8/2017 | Cheng | B60N 2/5833 |

FOREIGN PATENT DOCUMENTS

| | | | | |
|---|---|---|---|---|
| EP | 0145603 A2 * | 6/1985 | | A44B 18/0076 |
| FR | 2466330 A1 * | 4/1981 | | A44B 18/0076 |
| GB | 2364351 A * | 1/2002 | | A44B 18/0076 |
| JP | S63-85200 A | 6/1988 | | |
| JP | 04-297202 | 10/1992 | | |
| JP | 133711/1992 | 12/1992 | | |
| JP | 08-126502 | 5/1996 | | |
| JP | 2000-512174 A | 9/2000 | | |
| JP | 2002078512 A * | 3/2002 | | A44B 18/0076 |
| JP | 2004-236957 A | 8/2004 | | |
| JP | 2011-143231 A | 7/2011 | | |
| JP | 2011143231 A * | 7/2011 | | B60N 2/5833 |
| WO | 97/46129 | 12/1997 | | |
| WO | 2003/030672 A1 | 4/2003 | | |
| WO | WO-2010146667 A1 * | 12/2010 | | A44B 18/0049 |
| WO | 2012/025980 A1 | 3/2012 | | |
| WO | 2013/061423 A1 | 5/2013 | | |
| WO | WO-2015136674 A1 * | 9/2015 | | A44B 18/0076 |

OTHER PUBLICATIONS

Non Final Office Action, U.S. Appl. No. 15/119,167, dated Jan. 12, 2017, 8 pages.
International Search Report, PCT International Application No. PCT/JP2015/057567, dated Jun. 2, 2015.
Final Office Action, U.S. Appl. No. 15/119,167, dated Jul. 24, 2017, 13 pages.

* cited by examiner

MOLDED SURFACE FASTENER, CUSHION BODY, CUSHION BODY MANUFACTURING METHOD, AND MOLDING DIE

This application is a national stage application of PCT/JP2014/056754, which is incorporated herein by reference.

TECHNICAL FIELD

The present invention relates to a molded surface fastener that is integrated in a groove on a cushion body when the cushion body is foamed and molded, the cushion body to which the surface fastener is integrated, a method for manufacturing the cushion body and a molding die used to mold the cushion body.

BACKGROUND ART

Passenger seats of automobiles or trains, various kinds of sofas, office chairs, and the like are often formed by attaching a skin material such as fiber fabric or natural or synthetic leather to the surface of a cushion body (foaming body) molded in a predetermined shape by using a foam resin material. The cushion body used in these various seats often has a curved surface composed of convex-concave shapes satisfying human engineering factors in order to maintain a seating posture which provides no fatigue despite long-hour seating.

Moreover, when a skin material is attached to the surface of a cushion body, after molding the cushion body in a desired shape, a method of covering and fixing a skin material to the surface of the obtained cushion body is often employed. In particular, in this case, a molded surface fastener is generally used as means for fixing the surface of the cushion body and a rear surface of the skin material.

A molded surface fastener has a configuration in which a plurality of engaging elements (male engaging elements, for example) are disposed on one surface (first surface) of a base portion made from a thermoplastic resin, and such a molded surface fastener is integrally molded so that the engaging elements are exposed to the surface of the cushion body when the cushion body is molded. Moreover, a plurality of female engaging elements configured to be fastened to the engaging elements of the molded surface fastener are formed on the rear surface of the skin material that covers the cushion body.

After the skin material covers the cushion body to which the molded surface fastener is integrated, the female engaging elements (loop-shaped engaging elements) disposed on the rear surface of the skin material are pressed against the male engaging elements of the molded surface fastener disposed on the surface of the cushion body, whereby the skin material is fastened to the molded surface fastener. In this manner, the skin material is easily fixed to the surface of the cushion body along the convex-concave shapes of the surface, and the skin material is prevented from floating from the cushion body.

Examples of such a surface fastener integrated to the cushion body for fixing the skin material are disclosed in WO 2012/025980 (Patent Document 1) and WO 2013/061423 (Patent Document 2).

In such a surface fastener described in Patent Documents 1 and 2, a plurality of hook-shaped engaging elements stand on a flat plate-shaped substrate portion to form an engaging region which enables engagement with loop-shaped engaging elements.

When the surface fastener of Patent Documents 1 and 2 are integrated to the cushion body, a groove portion for fixing is provided on a surface portion of the cushion body to insert and fix a part of the skin material, and the surface fastener is integrated in a state that the substrate portion of the molded surface fastener is disposed in a groove bottom portion of the groove portion for fixing in substantially parallel to the surface of the cushion body, and the engaging region faces a side of an opening of the groove. Thereby, the engaging region of the molded surface fastener can be exposed largely inside the groove portion of the cushion body in a groove length direction and a groove width direction, which enables stable engagement of the female engaging elements of the skin material.

Meanwhile, since the substrate portion of the molded surface fastener in Patent Documents 1 or 2 is disposed in the groove portion for fixing a skin material of the cushion body in substantially parallel to the surface of the cushion body, the groove width of the groove portion for fixing the skin material provided on the surface portion of the cushion body needs to be large to a certain degree, and the engaging region of the molded surface fastener needs to be exposed sufficiently in order to obtain an appropriate engaging force to engage the skin material.

However, a large groove width of the groove portion provided on the surface of the cushion body may cause a looseness of the skin material attached to the cushion body. Further, the engaging portion of the skin material for engaging with the molded surface fastener of the cushion body may appear to recess in a strip-shape, which lowers quality of an outside appearance of a product depending on the product to which the cushion body is used.

In order to solve such a problem, Utility Model Publication JP63-85200A (Patent Document 3) discloses a method placing a molded surface fastener in which an engaging region is formed by hook-shaped engaging elements along a side wall portion of a groove portion for fixing a skin material provided on a surface of the cushion body.

As the surface fastener is provided on one side wall portion of the groove portion in the cushion body so that the substrate portion of the surface fastener is disposed in a direction perpendicular to the surface of the cushion body, and the engaging region of the surface fastener is exposed in the groove portion, an appropriate engaging force can be secured by narrowing a groove width of the groove portion for fixing the skin material provided on the surface of the cushion body, and exposing an engaging area of the engaging region of the molded surface fastener sufficiently.

Therefore, the skin material can be stably engaged with the surface fastener of the cushion body, which can prevent looseness of the skin material attached to the cushion body, and an outside appearance of a product to which a cushion body is used can be improved.

U.S. Pat. No. 5,101,539 (Patent Document 4) discloses a cushion body in which a surface fastener is integrated to a groove portion for fixing a skin material provided on a surface portion in a curved shape so as to have a cross-section in a substantially U-shape, and engaging elements of the surface fastener are placed on both side wall portions facing each other in the groove portion for fixing a skin material.

Since the surface fastener is provided in the groove portion for fixing the skin material of the cushion body as mentioned in Patent Document 4, a large engaging area of the engaging region of the surface fastener can be secured, and a groove width of the groove portion for fixing the skin material provided on the surface portion of the cushion body can be narrowed, as in Patent Document 3.

Further, in Patent Document 4, one of embodiments is that the surface fastener integrated to the cushion body has a plurality of hook-shaped engaging elements, and a hook portion disposed at a tip end portion of each engaging element extends only in a direction toward a groove bottom portion of the groove portion of the cushion body (see FIG. 4 of Patent Document 4).

As the hook portion at a tip end portion of each engaging element in the surface fastener extends only in a direction toward the groove bottom portion of the groove portion, a part of the skin material can be easily inserted into the groove portion of the cushion body. Further, even if a part of the skin material is pulled to be removed from the groove portion of the cushion body after the hook-shaped engaging elements of the surface fastener disposed in the groove portion of the cushion body are engaged with loop-shaped engaging elements disposed on a part of the skin material, the engaging state can be stably maintained, and it can be prevented that the skin material is separated from the cushion body.

PRIOR ART DOCUMENT

Patent Documents

Patent Document 1: WO 2012/025980
Patent Document 2: WO 2013/061423
Patent Document 3: Utility Model Publication JP63-85200
Patent Document 4: U.S. Pat. No. 5,101,539

SUMMARY OF INVENTION

Problems to be Solved by the Invention

When the skin material is fixed by attaching the surface fastener on a side wall portion of the groove portion for fixing the skin material provided on the cushion body, as mentioned in Patent Documents 3 and 4, in order to stably fix the skin material to the cushion body at a predetermined position without looseness, it is needed that the engaging region of the surface fastener is stably provided at a predetermined position in a groove depth direction with respect to the groove portion for fixing the skin material of the cushion body, and that foam resin material of the cushion body can be prevented from penetrating into the engaging region of the molded surface fastener when the cushion body is foamed and molded so that the engaging region is exposed in the groove portion.

However, Patent Document 3 does not specifically disclose a means to attach or integrate the surface fastener to the groove portion for fixing the skin material of the cushion body. Therefore, a position of the surface fastener attached to the groove portion for fixing the skin material of the cushion body may be displaced, and the foam resin material may penetrate into the engaging region when the cushion body is foamed and molded and the surface fastener is integrated to the cushion body.

In Patent Document 3, the surface fastener may be attached to the groove portion for fixing a skin material after the cushion body is foamed and molded. In this case, however, a molding process of the cushion body and an attaching process of the surface fastener need to be performed separately, which lowers operation efficiency.

In contrast, in Patent Document 4, when the cushion body is foamed and molded, the surface fastener is held at an exclusive V-shaped support member, and the cushion body is foamed and molded in a cavity of a molding die in a state that the support member is attached to the molding die of the cushion body.

Therefore, the surface fastener is stably attached to a predetermined position of the cushion body, and it can be prevented that the foam resin material penetrates into the engaging region of the surface fastener when the cushion body is foamed and molded.

However, when the exclusive support member is used for foam molding of the cushion body, as in Patent Document 4, operations such as holding the surface fastener with the support member and attaching the support member to the molding die are required, which results in a complicated operation process.

In Patent Document 4, a shape of a support-member holding portion to which the support member of the molding die is attached and held and a shape of the support member become complicated. Therefore, production cost for the molding die and the support member increases. Washing process washing the molding die and the support member is usually performed after the foam molding of the cushion body. When the molding die and the support member have complicated shapes, the washing process becomes complicated, and the washing time increases, which results in an increase in production cost.

The present invention has been made in view of the problems of the above conventional technique, and a specific object of the invention is to provide a molded surface fastener in which an engaging region formed of a plurality of hook-shaped engaging elements can be stably disposed at a predetermined position in a groove width direction with respect to a groove portion for fixing a skin material of a cushion body, and a desirable engaging force by the engaging elements can be stably obtained by preventing a foam resin material from penetrating into the engaging region at the time of foam molding of the cushion body; a cushion body to which the molded surface fastener is integrated; a method for manufacturing the cushion body and a molding die for molding the cushion body.

Means for Solving the Problems

In order to achieve the above object, a molded surface fastener provided by the present invention that is configured to be integrated to a groove portion for fixing a skin material provided on a surface portion of a cushion body along a length direction of the groove portion at a time of foam molding of the cushion body includes, as a basic structure, at least one surface fastener portion in which an engaging region is formed of a plurality of hook-shaped engaging elements standing on a first surface of a flat plate-shaped substrate portion being characterized in that a foldable piece portion extends from one of left and right end edge portions in a width direction which is perpendicular to the length direction of the surface fastener portion, at least a part of the foldable piece portion has flexibility which is foldable with respect to the surface fastener portion, and the surface fastener portion has a pair of first barrier portions standing along a width direction at both end portions in a length direction of the substrate portion between which the engaging region is disposed and a second barrier portion standing along the length direction at an end edge portion of an opposite side of a side of the foldable piece portion in the substrate portion.

In such a molded surface fastener of the present invention, each hook-shaped engaging element has a rising portion standing from the substrate portion and a hook portion extending in the width direction from an upper end of the rising portion, and the hook portion preferably extends only toward a side of the foldable piece portion.

In the molded surface fastener of the present invention, it is also preferable that the surface fastener portion forms a first surface fastener portion, and a second surface fastener portion having a symmetrical shape with respect to the first surface fastener portion about the foldable piece portion is disposed at an end edge portion on an opposite side of a side of the first surface fastener portion of the foldable piece portion.

Further, in the molded surface fastener of the present invention, it is preferable that at least one among the pair of the first barrier portions and the second barrier portion has two or more barrier rows, and in each barrier row, a plurality of wall bodies are disposed intermittently in a row, and the wall bodies of each barrier row are disposed to be staggered each other by staggering the positions in a row direction with respect to the wall bodies of the adjacent barrier row.

The foldable piece portion of the molded surface fastener in the present invention preferably includes a flat plate-shaped base portion and a hinge portion disposed between the base portion and the surface fastener portion and having higher flexibility than the base portion.

Alternately, the whole foldable piece portion of the molded surface fastener in the present invention may have constant flexibility.

It is preferable in the molded surface fastener of the present invention that a magnetic material is mixed in or attached to at least a part of an end edge portion on an opposite side of a side of the foldable piece portion of the surface fastener portion.

It is also preferable in the molded surface fastener of the present invention that third barrier portion stands along a length direction at an end edge portion on a side of the foldable piece portion in the surface fastener portion.

Further, in the molded surface fastener of the present invention, it is preferable that a plurality of surface fastener members provided with the surface fastener portion and the foldable piece portion are connected along a fastener length direction via a connecting member or a connecting portion.

Moreover, in the molded surface fastener of the present invention, a projected portion for positioning for a molding die of the cushion body is preferably provided on the first surface of the foldable piece portion.

According to the present invention, a cushion body in which the molded surface fastener provided with the above structure is integrated to the groove portion for fixing a skin material in a state that the engaging region is exposed can be provided.

A cushion body provided by the present invention includes a groove portion for fixing a skin material provided on a surface portion, and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, being characterized in that the molded surface fastener includes a foldable piece portion bending and extending from an end edge portion on a side of a groove bottom portion of the groove portion in the surface fastener portion and integrated to the groove bottom portion, and the surface fastener portion includes a pair of first barrier portions standing along the groove depth direction at both end portions in a length direction of the substrate portion between which the engaging region is disposed and a second barrier portion standing along a length direction at an end edge portion on a side of a groove opening portion of the groove portion of the substrate portion.

In the cushion body according to the present invention, it is preferable that each hook-shaped engaging element includes a rising portion standing from the substrate portion and a hook portion extending in the width direction from an upper end of the rising portion, and the hook portion extends only in a direction to a side of the foldable piece portion.

In the cushion body according to the present invention, it is also preferable that the above-mentioned surface fastener portion forms a first surface fastener portion, and a second surface fastener portion having a symmetrical shape with the first surface fastener portion about the foldable piece portion is disposed at an end edge portion on an opposite side of a side of the first surface fastener portion of the foldable piece portion, and integrated to the other side wall portion of the groove portion.

Next, the present invention provides a method for manufacturing a cushion body including a groove portion for fixing a skin material provided on a surface portion, and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, the method including:

molding the molded surface fastener in a shape that a foldable piece portion extends from one of left and right end edge portions in a width direction which is perpendicular to a length direction of the surface fastener portion, at least a part of the foldable piece portion has flexibility which is foldable with respect to the surface fastener portion, the surface fastener portion has a pair of first barrier portions standing along a width direction at both end portions in a length direction of the substrate portion between which the engaging region is disposed and a second barrier portion standing along the length direction at an end edge portion on an opposite side of a side of the foldable piece portion of the substrate portion;

preparing a molding die in which a fastener holding portion including a first holding portion holding the foldable piece portion of the molded surface fastener and second holding portions holding the surface fastener portion of the molded surface fastener are projected from an inner wall surface forming a surface of the cushion body;

placing the foldable piece portion of the molded surface fastener on the first holding portion of the molding die, and attaching the molded surface fastener to the fastener holding portion by closely contacting the surface fastener portion of the molded surface fastener to the second holding portions of the molding die in a folded manner with respect to the foldable piece portion; and performing foam molding in a cavity of the molding die to which the molded surface fastener is attached.

The method of the cushion body according to the present invention preferably includes containing or attaching a magnetic material in at least a part of the molded surface fastener, forming the fastener holding portion of the molding die of a magnet, and attaching the molded surface fastener to the fastener holding portion by magnetic attraction.

The present invention provides a molding die performing foam molding of a cushion body in which a groove portion for fixing a skin material is provided on a surface portion and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, being characterized in that a fastener holding portion is projected from an inner wall surface forming a surface of the cushion body, the fastener holding portion includes a first holding portion holding a foldable piece portion which extends from one of left and right end edge portions in a width direction of the surface fastener portion in the molded surface fastener and at least a part of which has flexibility, second holding portions holding the surface fastener portion of the molded surface fastener by closely contacting in a bent manner with respect to the foldable piece portion, the first holding portion is disposed at a tip end portion of the fastener holding portion, and the second holding portions are disposed on side wall portions of the fastener holding portion.

In such a molding die of the present invention, it is preferable that the fastener holding portion is formed of a magnet, the first and second holding portions have a magnetic attractive surface which can be attracted by magnetic force, and the magnetic attractive surface of the first holding portion and the magnetic attractive surface of the second holding portions are formed as a flat surface.

Effects of the Invention

The molded surface fastener according to the invention includes at least one surface fastener portion in which an engaging region is formed of a plurality of hook-shaped engaging elements standing on a flat plate-shaped substrate portion and a foldable piece portion extending from one end edge portion in a width direction of the surface fastener portion and at least a part thereof has flexibility.

Further, the surface fastener portion includes a pair of first barrier portions standing along a width direction at both end portions in a length direction of the substrate portion between which the engaging region is disposed, and preventing a foam resin material from penetrating into the engaging region from a length direction at the time of foam molding of the cushion body, and a second barrier portion standing along a length direction on a first surface on an end edge portion on an opposite side of the foldable piece portion of the substrate portion, and preventing the foam resin material from penetrating into the engaging region from a width direction at the time of foam molding.

According to the molded surface fastener of the present invention, when the cushion body is foamed and molded using a molding die, foam molding of the cushion body can be performed while the foldable piece portion of the molded surface fastener is held at the first holding portion of the fastener holding portion provided on the molding die in a state that the foldable piece portion of the molded surface fastener is folded with respect to the surface fastener portion, and the first and the second barrier portions of the surface fastener portion of the molded surface fastener are closely contacted to the second holding portions of the fastener holding portion.

The foldable piece portion can be used as a positioning portion by holding the surface fastener portion and the foldable piece portion at the fastener holding portion of the molding die in a state that both are folded at the time of foam molding of the cushion body. Therefore, a positioning operation of the molded surface fastener can be performed easily without using an exclusive support member, as mentioned in Patent Document 4, for example, and the molded surface fastener can be held at a predetermined position with respect to the molding die.

When the molded surface fastener is held at the fastener holding portion of the molding die, the first and the second barrier portions of the surface fastener portion are closely contacted with the second holding portions of the fastener holding portion, as mentioned above. Therefore, the foam resin material can be prevented from penetrating into the engaging region beyond the first and the second barrier portions of the molded surface fastener at the time of foam molding of the cushion body.

Accordingly, the molded surface fastener can be held at a predetermined position with respect to the molding die, and the foam resin material can be prevented from penetrating into the engaging region by holding the molded surface fastener of the present invention at the fastener holding portion of the molding die and performing foam molding of the cushion body using the foldable piece portion as a positioning portion. In this case, a groove portion for fixing a skin material having a small groove width is formed by the fastener holding portion of the molding die on the cushion body which is foamed and molded, and the molded surface fastener of the present invention can be stably placed at a predetermined position with respect to the groove portion for fixing a skin material of the cushion body. Further, even after the foam molding of the cushion body, the engaging region of the molded surface fastener can be exposed in the groove portion for fixing the skin material without being buried in the cushion body, which can secure a desired stable engagement force of the engaging elements.

Since the first and the second barrier portions are provided on the surface fastener portion, rigidity of the surface fastener portion can be enhanced. Therefore, lightweight of the surface fastener can be realized by, for example, reducing a thickness of the substrate portion of the surface fastener portion.

In the molded surface fastener of the present invention, each hook-shaped engaging element disposed at the surface fastener portion has a rising portion standing from the substrate portion and a hook portion extending from an upper end of the rising portion in a width direction, and the hook portion extends only in a direction toward a side of the foldable piece portion in a curved shape. Thereby, an extending direction of the hook portion in each hook-shape engaging element can be directed to a side of a groove bottom portion of the groove portion for fixing the skin material when the cushion body is foamed and molded as the above, and the molded surface fastener is integrated to the groove portion for fixing the skin material of the cushion body.

Accordingly, when an engaged insertion piece portion having loop-shaped engaging elements of the skin material is inserted into the groove portion for fixing the skin material of the cushion body, the insertion piece portion can be easily inserted to a predetermined depth in the groove portion for fixing the skin material of the cushion body.

Further, since the second barrier portion is provided at the surface fastener portion, the insertion piece portion of the skin material can be stably inserted to a predetermined depth of the groove portion for fixing the skin material using the second barrier portion as a mark. Moreover, even if the insertion piece portion of the skin material is inserted to a predetermined depth of the groove portion for fixing the skin material of the cushion body, and thereafter, the insertion piece portion is pulled to an exit direction, the hook portions of respective hook-shaped engaging elements extend toward one direction, and the loop-shaped engaging elements of the insertion piece portion tend to easily engage with the engaging region of the molded surface fastener, as well as the engagement state between them is stably maintained. Therefore, the skin material can be prevented from separating from the cushion body effectively, which prevents moving a position of the skin material with respect to the cushion body.

In the molded surface fastener of the present invention, the above-mentioned surface fastener portion forms a first surface fastener, and a second surface fastener having a symmetrical shape with respect to the first surface fastener portion about the foldable piece portion is disposed at an end edge portion of the foldable piece portion on an opposite side of a side of the first surface fastener portion. Thereby, when the foam molding of the cushion body is performed, the molded surface fastener can be stably held at the fastener holding portion of the molding die so that the fastener holding portion is placed between the first and the second surface fastener portions, and the molded surface fastener can be more stably placed at a predetermined position in the groove portion for fixing the skin material of the cushion body after the foam molding. Further, since the engaging region is disposed at each of the first and the second surface fastener portions, the skin material can be engaged and fixed more firmly to the molded surface fastener at the time of attaching the skin material to the cushion body.

In addition, in the molded surface fastener of the present invention, at least one of the pair of the first barrier portions and the second barrier portion has two or more barrier rows, a plurality of wall bodies are intermittently disposed in a line in each barrier row, and wall bodies of each barrier row are disposed to be staggered each other by staggering the positions in the row direction with respect to an adjacent barrier row. Therefore, lowering flexibility of the surface fastener portion due to formation of the barrier portions can be suppressed. Further, when the molded surface fastener is attached to the fastener holding portion of the molding die, and the foam molding of the cushion body is performed, the cushion body can be stably molded in a predetermined shape because the foam resin material can be prevented from penetrating into the engaging region and air in the engaging region can be easily pushed out of the barrier portions by the barrier portion having two or more barrier rows.

The foldable piece portion of the molded surface fastener of the present invention has a flat plate-shaped base portion and a hinge portion which is disposed between the base portion and the surface fastener portion and having higher flexibility than the base portion. The hinge portion means a portion connecting the base portion having higher rigidity than the hinge portion and the surface fastener portion, and moving as a pivot point (rotating axis) when the base portion is rotated to bend with respect to the surface fastener portion. With the hinge portion, the surface fastener can be easily folded from a linear state to a bent (curved) state, for example.

Since the foldable piece portion of the present invention has the above-mentioned base portion and the hinge portion, when the molded surface fastener is set at the fastener holding portion of the molding die, the foldable piece portion of the molded surface fastener is placed at a tip end surface of the fastener holding portion, and thereafter, the surface fastener portion can be easily folded to a side of the fastener holding portion with respect to the foldable piece portion around the hinge portion. Therefore, the molded surface fastener can be easily and promptly attached to a predetermined position of the fastener holding portion of the molding die with a predetermined shape, which enhances operational efficiency of attaching the molded surface fastener to the molding die effectively.

In the molded surface fastener of the present invention, a whole foldable piece portion may have constant flexibility by, for example, configuring the whole foldable piece portion to have a foldable constant thickness. Thereby, when the molded surface fastener is set and held at the fastener holding portion of the molding die, the foldable piece portion of the molded surface fastener is set on the tip end surface of the fastener holding portion, and the surface fastener portion can be easily folded to a side of the fastener holding portion with respect to the foldable piece portion around the hinge portion. Therefore, the molded surface fastener can be easily and promptly attached to a predetermined position of the fastener holding portion of the molding die with a predetermined shape.

In the molded surface fastener of the present invention, magnetic materials such as magnetic particles are mixed in or attached to at least a part of an end edge portion of the surface fastener portion on an opposite side of the foldable piece portion. Therefore, when the fastener holding portion of the molding die is formed of a magnet, for example, the surface fastener portion can be automatically folded with respect to the foldable piece portion, and a position of the molded surface fastener can be precisely adjusted automatically at a predetermined position of the fastener holding portion by moving the molded surface fastener closer to the fastener holding portion of the molding die and utilizing the magnetic force between the fastener holding portion (magnet) and the magnetic materials of the molded surface faster. Thus, the operating efficiency can be more improved.

In the molded surface fastener of the present invention, third barrier portion stands along a length direction at an end edge portion of the surface fastener portion on a side of the foldable piece portion. This can effectively prevent the foam resin material from penetrating into the engaging region at the time of foam molding of the cushion body.

Further, in the molded surface fastener of the present invention, a plurality of surface fastener members having the surface fastener portion and the foldable piece portion are connected along a length direction of the fastener via a connecting member or a connecting portion. When the groove portion for fixing the skin material of the cushion body is formed in a curved or a bent shape in a width direction with respect to the length direction, for example, the molded surface fastener can be integrated to the cushion body in a easily curved or bent state along the curved shape or the bent shape of the groove portion for fixing the skin material.

In addition, in the molded surface fastener of the present invention, a projected portion for positioning of the cushion body with respect to the molding die is formed on a first surface of the foldable piece portion. Therefore, when the molded surface fastener is set and held at the fastener holding portion of the molding die, a position of the molded surface fastener with respect to the fastener holding portion can be easily and certainly adjusted, and an attaching operation of the molded surface fastener to the fastener holding portion can be performed stably and efficiently.

According to the present invention, the cushion body to which the molded surface fastener provided with the above configuration is integrated to the groove portion for fixing the skin material in a state that the engaging region is exposed in the groove portion. In such a cushion body of the present invention, a dimension of the groove width of the groove portion for fixing the skin material formed on the cushion body can be set small, and the molded surface fastener can be integrally and stably fixed to a predetermined position of the groove portion for fixing the skin material in a state that the engaging region is exposed. Therefore, the skin material can be stably engaged with the molded surface fastener of the cushion body with a desired engaging force, which can prevent looseness of the skin material attached to the cushion body. In addition, the groove width of the groove portion for fixing the skin material formed on the cushion body can be narrow, and an appearance of products configured with the skin material attached to the cushion body can be improved, which enhances outer appearance quality of the products.

In the cushion body of the present invention, a hook portion disposed at a tip end portion of each hook-shaped engaging element of the surface fastener portion in the molded surface fastener is curved in one direction toward a side of the groove bottom portion of the groove portion for fixing the skin material. Therefore, when an insertion piece portion having loop-shaped engaging elements of the skin material is inserted in the groove portion for fixing the skin material of the cushion body, the insertion piece portion can be easily inserted to a predetermined depth of the groove portion for fixing the skin material of the cushion body. After the insertion piece portion of the skin material is inserted to a predetermined depth of the groove portion for fixing the skin material of the cushion body, even if the insertion piece portion is pulled to an exit direction, an engaging state between loop-shaped engaging elements of the insertion piece portion and hook-shaped engaging elements of the molded surface fastener can be stably maintained. Thus, the skin material can be effectively prevented from separating from the cushion body or moving a position of the skin material with respect to the cushion body.

The cushion body of the present invention has a groove portion for fixing the skin material provided on a surface portion, and a molded surface fastener including at least one surface fastener portion in which an engaging region is formed of a plurality of hook-shaped engaging elements standing on a flat plate-shaped substrate portion and a foldable piece portion extending from one end edge portion in a width direction of the surface fastener portion and at least a part of which has flexibility is integrated to the groove portion in a state that the engaging region is exposed. In this case, the surface fastener portion of the molded surface fastener is integrated to a side wall portion of the groove portion, and the foldable piece portion is integrated to the groove bottom portion of the groove portion.

The surface fastener portion of the molded surface fastener has a pair of first barrier portions standing along a width direction at both end portions in a length direction of the substrate portion between which the engaging region is placed and a second barrier portion standing along a length direction on an end edge portion on an opposite side of a side of the foldable piece portion of the substrate portion.

In the cushion body of the present invention to which the molded surface fastener is integrated, when the cushion body is foamed and molded, the molded surface fastener is held in a predetermined position with respect to the molding die, and the foam resin material can be prevented from penetrating into the engaging region beyond the first and second barrier portion of the molded surface fastener at the time of foam molding.

Accordingly, the molded surface fastener can be stably placed at a predetermined position of the groove portion for fixing the skin material of the cushion body, and a desired engaging force by the engaging elements of the molded surface fastener can be stably secured. Therefore, when the skin material is attached to the cushion body of the present invention, looseness of the skin material attached to the cushion body can be prevented, which improves outer appearance quality of products to which the cushion body is used.

Each hook-shaped engaging element of the molded surface fastener of the cushion body in the present invention has a rising portion standing from the substrate portion and a hook portion extending from an upper end of the rising portion toward the width direction. The hook portion of each engaging element extends only in a direction toward a side of the foldable piece portion. Therefore, when the insertion piece portion having loop-shaped engaging elements of the skin material is inserted to the groove portion for fixing the skin material of the cushion body, the insertion piece portion can be easily inserted to a predetermined depth of the groove portion for fixing the skin material of the cushion body, and the skin material can be stably engaged with the engaging region of the molded surface fastener, which can effectively prevent the skin material from separating from the cushion body.

In the cushion body of the present invention, the above-mentioned surface fastener portion forms a first surface fastener portion, and a second surface fastener portion having a symmetrical shape with respect to the first surface fastener portion about the foldable piece portion is disposed at an end edge portion of the foldable piece portion on an opposite side of a side of the first surface fastener portion, and integrated to another side wall portion of the groove portion.

Thereby, the molded surface fastener can be stably held at the fastener holding portion of the molding die so as to hold the fastener holding portion between the first and the second surface fastener portions at the time of foam molding of the cushion body, and the molded surface fastener can be more stably disposed at a predetermined position in the groove portion for fixing the skin material of the cushion body after foam molding. Further, since the engaging region is provided in each of the first and the second surface fastener portions, the skin material can be more firmly engaged and fixed to the molded surface fastener when the skin material is attached to the cushion body.

In a method for manufacturing a cushion body of the present invention, first, a molded surface fastener having a predetermined shape is molded. In this case, the molded surface fastener is formed in a shape that a foldable piece portion is extended from one of left and right end edge portions in a width direction which is perpendicular to a length direction of the surface fastener portion, at least a part of the foldable piece portion has flexibility so that the foldable piece portion can be folded with respect to the surface fastener portion, the surface fastener portion includes a pair of first barrier portions standing along a width direction on a first surface of both end portions in a length direction of the substrate portion so that the engaging region is disposed between them, and a second barrier portion standing along a length direction on a first surface of an end edge portion on an opposite side of a side of the foldable piece portion of the substrate portion.

Besides molding of the molded surface fastener, a molding die in which a fastener holding portion having first and second holding portions respectively holding the foldable piece portion and the surface fastener portion of the molded surface fastener are projected from an inner wall surface (cavity surface) forming a surface of the cushion body is prepared.

Then, the molded surface fastener is attached to the fastener holding portion by setting the foldable piece portion of the molded surface fastener on the first holding portion of the molding die and closely contacting the surface fastener portions of the molding surface fastener with the second holding portions of the molding die in a bent state with respect to the foldable piece portion. Thereafter, foam molding is performed by injecting a foam resin material in a cavity of the molding die to which the molded surface fastener is attached.

Thereby, the cushion body in which the groove portion for fixing a skin material is provided on a surface portion by the fastener holding portion, the molded surface fastener portion is integrated in the groove portion for a skin material in a state that the surface fastener portion in which the engaging region is exposed is disposed on a side wall portion of the groove portion and the foldable piece portion is disposed on the groove bottom portion of the groove portion in a folded state with respect to the surface fastener portion can be stably manufactured.

In the method for manufacturing the cushion body of the present invention, a magnetic material is inserted in or attached to at least a part of the molded surface fastener at the time of molding the molded surface fastener, and the fastener holding portion of the prepared molding die is formed of a magnet. Thus, when the molded surface fastener is attached to the molding die, the molding surface fastener can be magnetically attracted to and easily held at the fastener holding portion using a magnetic force between the magnetic material mixed in or attached to the molded surface fastener and the magnet forming the fastener holding portion of the molding die.

Accordingly, the surface fastener portion is folded with respect to the foldable piece portion automatically and a position of the molded surface fastener can be adjusted automatically at a predetermined position of the fastener holding portion by setting the foldable piece portion of the molded surface fastener on the first holding portion of the fastener holding portion in the molding die, for example. Therefore, a setting operation of the molded surface fastener to the molding die can be efficiently performed. Further, the molded surface fastener can be stably held at the fastener holding portion in a closely contacted manner.

In the molding die of the cushion body in the present invention, a fastener holding portion holding the molded surface fastener is projected from an inner wall surface (cavity surface) forming a surface of the cushion body, and the fastener holding portion is provided with a first holding portion disposed at a tip end portion of the fastener holding portion and holding a foldable piece portion of the molded surface fastener and second holding portions disposed at side wall portions of the fastener holding portion and holding the surface fastener portions of the molded surface fastener by closely contacting in a bent state with respect to the foldable piece portion.

Since the foam molding of the cushion body is performed in a state that the molded surface fastener is held at the fastener holding portion of the molding die, the cushion body having a predetermined shape in which the groove portion for fixing the skin material is provided on a surface portion by the fastener holding portion, and the molded surface fastener is integrated to the groove portion for fixing the skin material in a state that the surface fastener portion in which the engaging region is exposed is disposed at a side wall portion of the groove portion and the foldable piece portion in a folded state with respect to the surface fastener portion is disposed in the groove bottom portion of the groove portion can be stably manufactured.

The fastener holding portion in the molding die of the present invention is formed of a magnet. Therefore, when the molded surface fastener at least a part of which a magnetic material is mixed in or attached to, for example, is attached to the fastener holding portion of the molding die, the molded surface fastener can be easily attracted to and held at the fastener holding portion by using a magnetic force between the magnetic material mixed in the molded surface fastener and the magnet forming the fastener holding portion of the molding die.

Thus, since the foldable piece portion of the molded surface fastener is set on the first holding portion of the fastener holding portion of the molding die, for example, and the surface fastener portion is automatically folded with respect to the foldable piece portion and a position of the molded surface fastener can be automatically precisely adjusted to a predetermined position of the fastener holding portion. Therefore, a setting operation of the molded surface fastener to the molding die can be efficiently performed. Further, the molded surface fastener can be stably held at the fastener holding portion in a close contact state.

In the molding die of the present invention, both of the first holding portion and the second holding portions disposed at the fastener holding portion have an attractive surface capable of attracting by a magnetic force, and the attractive surface of the first holding portion and the attractive surfaces of the second holding portions are formed as a flat surface, respectively. As a result, the molded surface fastener can be attracted to and easily held at the fastener holding portion using the magnetic force between the magnetic material mixed in or attached to the molded surface fastener and the magnet forming the fastener holding portion of the molding die. Further, when the molding die is washed to remove a mold release agent, for example, from the molding die after the foam molding of the cushion body, the first and second holding portions of the fastener holding portion which has a flat surface can be washed easily and in a short time, which results in improvement of production efficiency and reduction in production cost of the cushion body.

MODES FOR CARRYING OUT THE INVENTION

Hereinafter, modes for carrying out the invention will be described in detail showing embodiments with reference to the drawings. Please note that the present invention is not limited to the embodiments explained as below, and various changes can be made as long as having a substantially same structure and similar functional effects. For example, a number of hook-shaped engaging elements disposed on a surface fastener portion, a position to be disposed and a pitch to be attached are not limited, and can be changed randomly.

Embodiment 1

Figure 1:
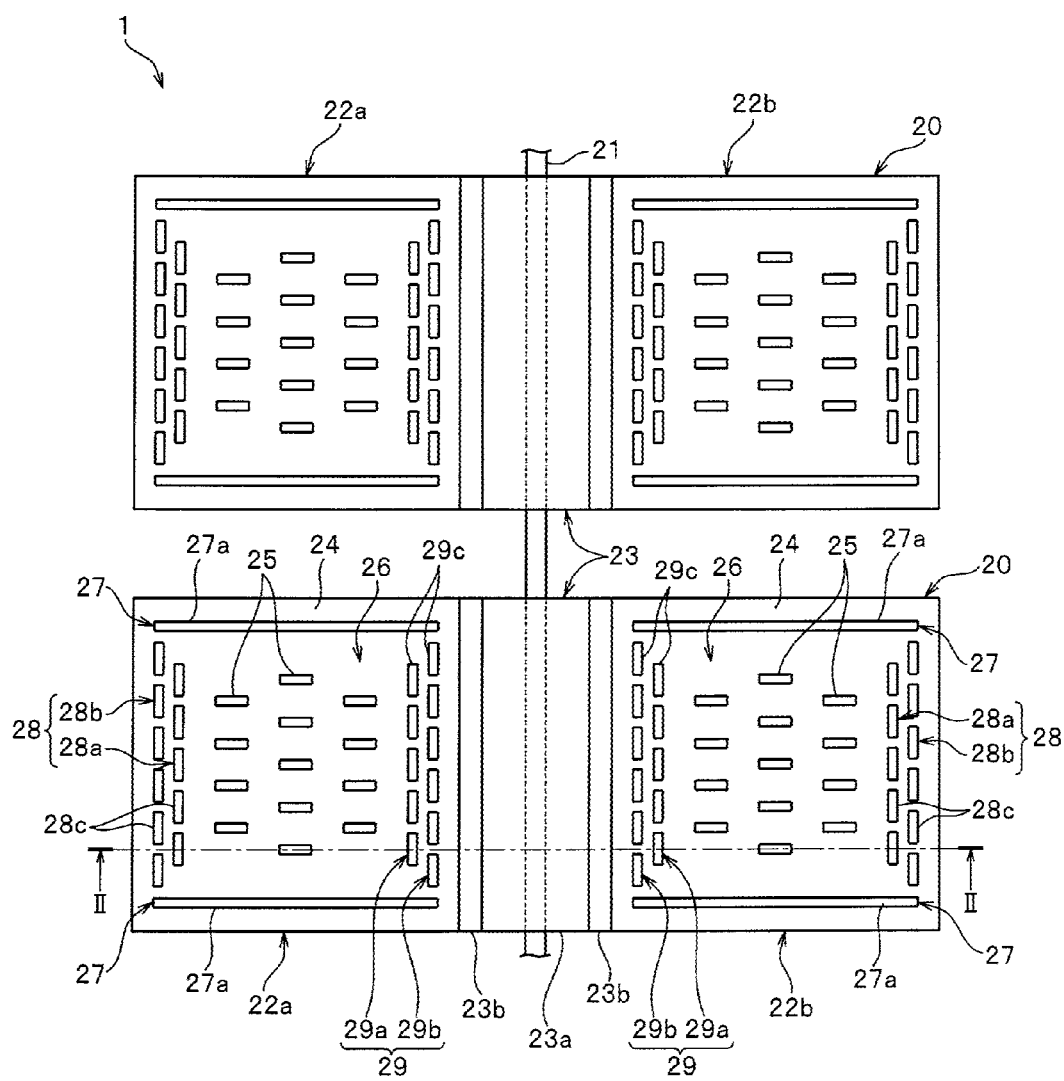
FIG. 1 is a plan view illustrating a molded surface fastener according to Embodiment 1 of the present invention.
Figure 2:
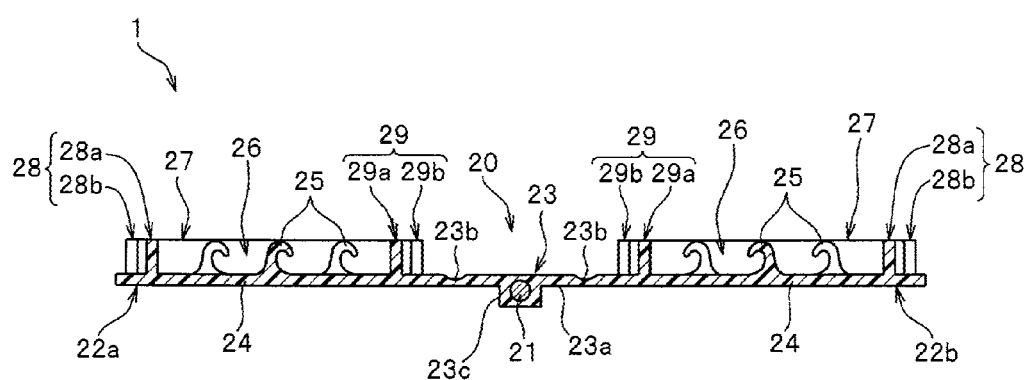
FIG. 2 is a cross-sectional view along the line II-II of FIG. 1.

FIG. 1 is a plan view illustrating a molded surface fastener according to Embodiment 1, and FIG. 2 is a cross-sectional view along the line II-II in FIG. 1.

In the following descriptions, a length direction or a front and rear direction regarding a molded surface fastener is defined as a same direction as a length direction of a groove portion for fixing a skin material formed on a surface of a cushion body to which the molded surface fastener is integrated. That is, when seeing FIG. 1, a direction of upside in FIG. 1 is referred to as "frontward", and an opposite direction is referred to as "rearward". The length direction of the groove portion for fixing a skin material means a direction perpendicular to a groove width direction and a groove depth direction of the groove portion for fixing a skin material.

A width direction or a left and right direction regarding the molded surface fastener means a direction perpendicular to the length direction or the front-rear direction and along a substrate portion of a surface fastener portion, as mentioned later, of the molded surface fastener. A direction of a left side and a right side when seeing FIG. 1 are referred to as "left direction" and "right direction", respectively. Further, a height direction or a vertical direction of the molded surface fastener means a direction perpendicular to the length direction or the front-rear direction, and a direction perpendicular to a first surface or a second surface of the substrate portion of the surface fastener portion of the molded surface fastener. Particularly, when facing to FIG. 1, a direction of a near side is referred to as "upper direction", and an opposite direction is referred to as "lower direction".

Molded surface fastener 1 according to Embodiment 1 is configured to have a plurality of surface fastener members 20 disposed along the length direction and a code-shaped connecting member 21 fixed to respective surface fastener members 20, and is long in the length direction. Each surface fastener member 20 is connected to an adjacent surface fastener member 20 with a predetermined interval by the connecting member 21. A code-shaped member such as a twist string and a long member having flexibility such as a monofilament are used as the connecting member 21.

The molded surface fastener 1 of the Embodiment 1 is manufactured by molding a surface fastener member 20 which is integrally injected by molding a material in which magnetic materials (magnetic particles) are mixed in thermoplastic resin using a die wheel, as described later, and inserting and fixing the connecting member 21 to respective surface fastener members 20 at the time of molding the surface fastener members 20. It should be noted that the material of the surface fastener member 20 is not limited, and a material having resiliency such as thermoplastic resin including polyester, nylon and polypropylene, or a compound in which thermoplastic elastomer is contained in such thermoplastic resin may be used.

Each surface fastener member 20 includes a left and right pair of first and second surface fastener portions 22a, 22b and a foldable piece portion 23 disposed between the pair of first and second surface fastener portions 22a, 22b.

When the first and the second surface fastener portions 22a, 22b and the foldable piece portion 23 are held in a linear shape along a width direction, the first and second surface fastener portions 22a, 22b have a symmetrical shape with each other about a center part in the width direction of the foldable piece portion 23.

Thus, in a following explanation of the surface fastener portion, the first surface fastener portion 22a disposed on a left side of the foldable piece portion 23 is mainly described, and the second surface fastener portion 22b on the other side is represented with as same numerals as the first surface fastener portion 22a instead of being explained in detail.

In Embodiment 1, the first surface fastener portion 22a disposed on a left side edge portion of the foldable piece portion 23 has a flat plate-shaped substrate portion 24, a plurality of hook-shaped engaging elements (male engaging elements) 25 standing on an upper surface (first surface) of the substrate portion 24 and forming an engaging region 26, a pair of first barrier portions 27 standing along a width direction on an upper surface of a front end edge portion and a rear end edge portion of the substrate portion 24 so that the engaging region 26 is placed between them, a second barrier portion 28 standing along the length direction on an end edge portion (left side end edge portion) on an opposite side of a side of the foldable piece portion 23 of the substrate portion 24 and third barrier portion 29 standing along the length direction at an end edge portion (right side end edge portion) on a side of the foldable piece portion 23 of the substrate portion 24.

The substrate portion 24 of the first surface fastener portion 22a has a thin flat plate shape in thickness which is a rectangular shape when the first surface fastener portion 22a is viewed from the upper direction side or the lower direction side (side of height direction), and a thickness of the entire substrate portion 24 is constant. In Embodiment 1, the upper surface (first surface) and the lower surface (second surface) of the substrate portion 24 are formed as a plate surface, respectively. In the present invention, however, it is possible to provide a plurality of concave groove portions or convex rib portions parallel to each other on the lower surface of the substrate portion 24, for example, and thereby fixing strength of the molded surface fastener 1 with respect to the cushion body 10 can be enhanced by increasing a contacted area of the lower surface of the substrate portion 24 of the surface fastener member 20 and the cushion body 10 when the molded surface fastener 1 is integrated to the cushion body 10 (foaming body) at the time of foam molding, as mentioned later.

Each engaging element 25 of the first surface fastener portion 22a has a rising portion rising from the upper surface of the substrate portion 24 and a hook portion (hook-shaped engaging head) curving and extending from an upper end of the rising portion in a reverse J-shape or a reverse L-shape. Respective engaging elements 25 disposed at the first surface fastener portion 22a from the substrate portion 24 have the same height dimension (vertical dimension) each other. The hook portion disposed at a tip end portion of all of the engaging elements 25 extends from the upper end of the rising portion only to a side of the foldable piece portion 23.

These engaging elements 25 are placed in lines at a predetermined attachment pitch in the length direction and the width direction on the engaging region 26 surrounded by the pair of the first barrier portions 27, the second barrier portion 28 and the third barrier portion 29 on the upper surface of the substrate portion 24 so as to obtain an appropriate engaging force with a skin material 11 to cover the cushion body 10.

In a case of Embodiment 1, rows of the engaging elements 25 (engaging element rows) lined along the length direction between the second barrier portion 28 and the third barrier portion 29 are formed in three rows in the width direction. In this case, positions of the engaging elements 25 of the first engaging element row disposed on a side of the second barrier portion 28 and of the third engaging element row disposed on a side of the third barrier portion 29 are formed to correspond to each other, and the positions of the engaging elements 25 of the first and the third engaging element rows and a position of the engaging elements 25 of the second engaging element row formed between the first and the third engaging element rows are formed to be staggered each other in a length direction. Therefore, in the engaging region 26 of Embodiment 1, the engaging elements 25 are placed to be staggered relative positions between adjacent engaging elements rows.

Further, in Embodiment 1, a dimension in a height direction (height dimension) of each engaging element 25 from the substrate portion 24 is set to be same as a height dimension of the first barrier portions 27 to the third barrier portion 29, as mentioned later. Thus, in a foam molding process of the cushion body 10, as mentioned later, when the molded surface fastener 1 is held at the fastener holding portion 15a of the molding die 15, the upper surfaces of the first barrier portions 27 to the third barrier portion 29 of the first and the second surface fastener portions 22a, 22b can be stably contacted closely to the fastener holding portion 15a without being disturbed by the engaging elements 25.

Since the height dimension of the engaging element 25 is set as the above, the hook portion of the engaging element 25 can be disposed at a position as far as possible (high position) from the substrate portion 24. Therefore, when the cushion body 10 to which the molded surface fastener 1 of the Embodiment 1 is integrated is manufactured, it becomes easier to engage loop-shaped engaging elements (female engaging elements) of the skin material 11 to be attached to the cushion body 10 with the hook-shaped engaging elements 25 of the molded surface fastener 1. It should be noted that in the present invention, as long as height dimensions of the first barrier portion 27 to the third barrier portion 29 are same each other, the height dimension of the engaging elements 25 can be set smaller than the height dimension of the first barrier portion 27 to the third barrier portion 29.

The pair of front and rear first barrier portions 27 disposed on the first surface fastener portion 22a of Embodiment 1 stand on the upper surface of the front end edge portion and the rear end edge portion of the substrate portion 24 which face adjacent surface fastener members 20, and each first barrier portion 27 is formed of a single lateral wall body 27a continuing along a width direction. In this case, the lateral wall body 27a is disposed at a position slightly inside (a side of the engaging region 26) of the front end edge portion or the rear end edge portion of the substrate portion 24.

The lateral wall body 27a constituting the first barrier portion 27 is formed to have a constant height dimension from the substrate portion 24 of the lateral wall body 27 and a constant dimension in a length direction between a front surface and a rear surface of the lateral wall body 27a (wall thickness of the lateral wall body 27a) throughout the width direction. The height dimension of the lateral wall body 27a is set to be the same as the height dimension of the engaging element 25.

Since the pair of the front and rear first barrier portions 27 are disposed, rigidity of the surface fastener portion can be effectively enhanced. Further, a foam resin material can be prevented from penetrating into the engaging region 26 beyond the first barrier portions 27 by closely contacting an upper surface of the lateral wall body 27a of the first barrier portion 27 to the fastener holding portion 15a, as described later, of the molding die 15 at the time of foam molding.

In the present invention, it is also possible to configure either or both of the pair of the first barrier portions 27 to have two or more barrier rows in which a plurality of wall bodies are disposed in a line intermittently, as in the second barrier portion 28 as mentioned later.

The second barrier portion 28 disposed at the first surface fastener portion 22a in Embodiment 1 stand along a length direction on an upper surface of a left side end edge portion (an end edge portion on an opposite side of a side of the foldable piece portion 23) of the substrate portion 24 to continue between left side end portions of the front and rear first barrier portions 27 (end portions on an opposite side of a side of the foldable piece portion 23). In this case, the second barrier portion 28 is disposed on a position slightly inside the left side end edge of the substrate portion 24 (side of the engaging region 26).

The second barrier portion 28 has two rows along the length direction disposed in a line in a width direction, which are an inner side barrier row 28a and an outer side barrier row 28b. The inner side barrier 28a is disposed between the outer side barrier row 28b and the engaging region 26. The inner side barrier row 28a is formed of five vertical wall bodies 28c disposed along the length direction intermittently at a predetermined attaching pitch.

The outer side barrier row 28b is formed of six vertical wall bodies 28c disposed along the length direction intermittently at a predetermined attaching pitch. The vertical wall bodies 28c of the inner side barrier row 28a and the vertical wall bodies 28c of the outer side barrier row 28b are disposed to be staggered each other by staggering the positions in the row direction (length direction).

Respective vertical wall bodies 28c disposed on the inner side barrier row 28a and the outer side barrier row 28b in the Embodiment 1 are formed to have a same shape and a same dimension. A height dimension of the respective vertical wall bodies 28c are set to be the same as the height dimension of the engaging element 25 and the lateral wall body 27a of the first barrier portion 27.

Since the second barrier portion 28 is formed of a plurality of the vertical wall bodies 28c, as mentioned above, lowering flexibility of the surface fastener member 20 in the length direction due to a formation of the second barrier portion 28 can be suppressed. Further, by closely contacting an upper surfaces of respective vertical wall bodies 28c of the second barrier portions 28 to the fastener holding portion 15a, as mentioned later, of the molding die 15 at the time of foam molding of the cushion body 10, the foam resin material can be prevented from penetrating into the engaging region 26 beyond the second barrier portion 28 and an air in the engaging region 26 can be easily exited to an outside of the second barrier portion 28.

In the present invention, in a case that either or both of the pair of first barrier portions 27 has two or more barrier rows, and in each barrier row, a plurality of wall bodies are disposed in a line intermittently, for example, the second barrier portion 28 can be formed of a single vertical wall body continuing along the length direction. The third barrier portion 29 disposed at the first surface fastener portion 22a in Embodiment 1 is configured as a symmetrical shape with the second barrier portion 28 of the first surface fastener portion 22a about a center portion in a width direction of the engaging region 26.

That is, the third barrier portion 29 in Embodiment 1 stand along a length direction on an upper surface of a right side end edge portion (end edge portion on a side of the foldable piece portion 23) of the substrate portion 24 to continue between right side end edge portions (end portions on a side of the foldable piece portion 23) of the pair of the front and rear first barrier portions 27.

The third barrier portion 29 has two rows along a length direction disposed in a line in a width direction which are an inner side barrier row 29a and an outer side barrier row 29b. The inner side barrier row 29a is disposed between the outer side barrier row 29b and the engaging region 26. The inner side barrier row 29a is formed of five vertical wall bodies 29c disposed along the length direction intermittently at a predetermined attaching pitch.

The outer side barrier row 29b is formed of six vertical wall bodies 29c disposed along the length direction intermittently at a predetermined attaching pitch. The vertical wall bodies 29c of the inner side barrier row 29a and the vertical wall bodies 29c of the outer side barrier row 29b are disposed to be staggered each other by staggering the positions in the row direction (length direction).

Respective vertical wall bodies 29c disposed on the inner side barrier row 29a and the outer side barrier row 29b are formed to have a same shape and a same dimension. A height dimension of the respective vertical wall bodies 29c are set to be the same as the height dimension of the engaging element 25 and the lateral wall body 27a of the first barrier portion 27. That is, in Embodiment 1, respective upper surfaces of the engaging elements 25, the first barrier portions 27, the second barrier portion 28 and the third barrier portion 29 are positioned to be included in a same flat surface.

The foldable piece portion 23 connecting the first and the second surface fastener portions 22a, 22b in Embodiment 1 is configured to have the same length dimension (a dimension in the length direction) as the substrate portion 24 of the first and the second surface fastener portions 22a, 22b. The foldable piece portion 23 has a flat plate-shaped base portion 23a, a hinge portion 23b disposed at end edge portions on sides of the first and the second fastener portions 22a, 22b of the base portion 23b and a fixing portion 23c disposed on a side of a lower surface (second surface) of the base portion 23a and fixing the connecting member 21.

The base portion 23a of the foldable piece portion 23 has a constant thickness dimension same as the thickness dimension of the substrate portion 24 of the first and the second fastener portions 22a, 22b except a region to which the connecting portion member 21 is fixed so as to have a certain degree of rigidity, and the base portion 23a itself is formed to be less likely folded. A dimension of the base portion 23a in a width direction is appropriately set according to a dimension in the groove width direction of the groove portion for fixing a skin material 10 formed on the cushion body 10.

The hinge portion 23b of the foldable piece portion 23 is formed of a concave groove portion provided on an upper surface of the foldable piece portion 23 along a length direction, and has higher flexibility than the base portion 23a by having a smaller thickness dimension than a part of the base portion 23a (except the region to which the connecting member 21 is fixed).

The foldable piece portion 23 is connected to left and right first and second surface fastener portions 22a, 22b via the hinge portion 23b. Therefore, the foldable piece portion 23 is formed to be able to fold with respect to the first surface fastener portion 22a and the second surface fastener portion 22b about the hinge portion 23b. In other words, the first surface fastener portion 22a and the second surface fastener portion 22b can be folded with respect to the base portion 23a of the foldable piece portion 23 about the hinge portion 23b so as to rotate in an upper or a lower direction, as shown in the cross-sectional view of the molded surface fastener 1 in FIG. 2.

The fixing portion 23c of the foldable piece portion 23 has a rectangular cross-sectional shape, and is projected from a lower surface of the base portion 23a. The fixing portion 23c wraps the connecting member 21 to be integrally fixed to the foldable piece portion 23. Although the fixing portion 23c is provided throughout the length direction of the foldable piece portion 23 in Embodiment 1, it may be provided only on a part of a region in the length direction of the foldable piece portion 23, in the present invention.

The connecting member 21 is fixed to the foldable piece portion 23 of respective surface fastener members 20 so as to penetrate the fixing portion 23c in the length direction, and a plurality of surface fastener members 20 are connected with each other by the connecting member 21 at a predetermined interval. In this case, a distance of the interval of the respective surface fastener members 20 fixed to the connecting member 21 is not limited, and it is preferable to set the distance so that adjacent surface fastener members 20 do not interfere with each other when the molded surface fastener 1 is bent to a predetermined curvature in left and right direction to curve the connecting member 21, for example.

Figure 3:
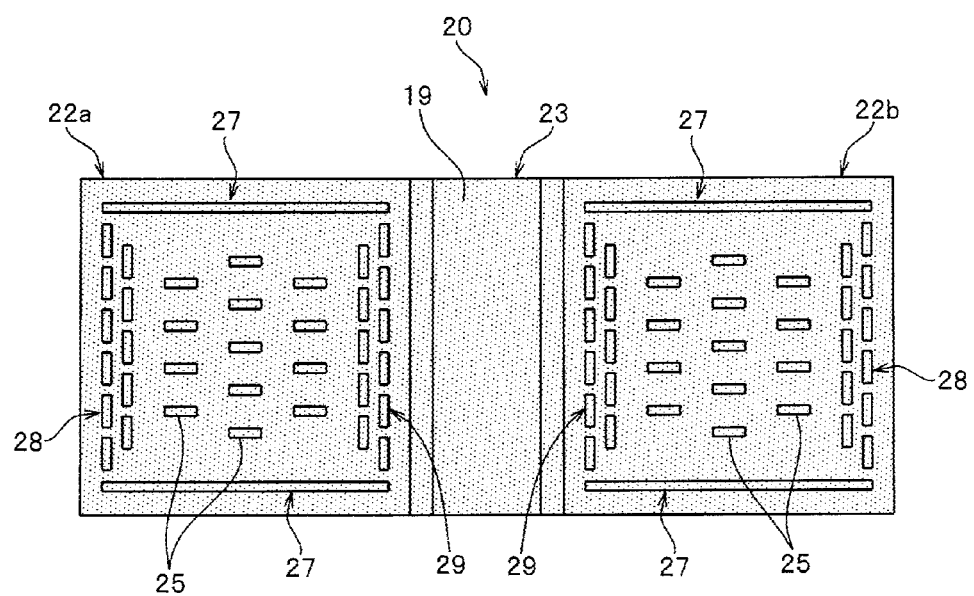
FIG. 3 is an explanatory view illustrating a region of the molded surface fastener in which magnetic particles are mixed.

In the molded surface fastener 1 of the above mentioned Embodiment 1, magnetic particles containing alloy of iron, cobalt, nickel and others are mixed to synthetic resin (or a compound of synthetic resin and elastomer) constituting the molded surface fastener 1. In Embodiment 1 in particular, the magnetic particles are mixed uniformly in entire surface fastener members 20 including the engaging elements 25 and the first barrier portions 27 to the third barrier portion 29, as shown in FIG. 3 in which a mixed region 19 of the magnetic particles in the surface fastener members 20 is colored. Materials of the magnetic particles to be mixed are not limited as long as they are magnetically attracted to a magnet.

Since the magnetic particles are mixed in the surface fastener members 20, when the fastener holding portion 15a of the molding die 15 is formed of a magnet, as mentioned later, the surface fastener members 20 can be stably attracted and fixed to the fastener holding portion 15a of the molding die 15 by using a magnetic attractive force between the magnet of the fastener holding portion 15a and the magnetic particles mixed in the surface fastener members 20.

In Embodiment 1, the mixed region of the magnetic particles to be mixed in the surface fastener members 20 spreads to entire surface fastener members 20, as mentioned above. However, the mixed region of the magnetic particles can be randomly changed depending on production methods of the molded surface fastener 1 as long as the magnetic particles are mixed in at least a part of the region on an outer side end edge portion on an opposite side of a side of the foldable piece portion 23 in the first and second surface fastener portions 22a, 22b.

Figure 4:
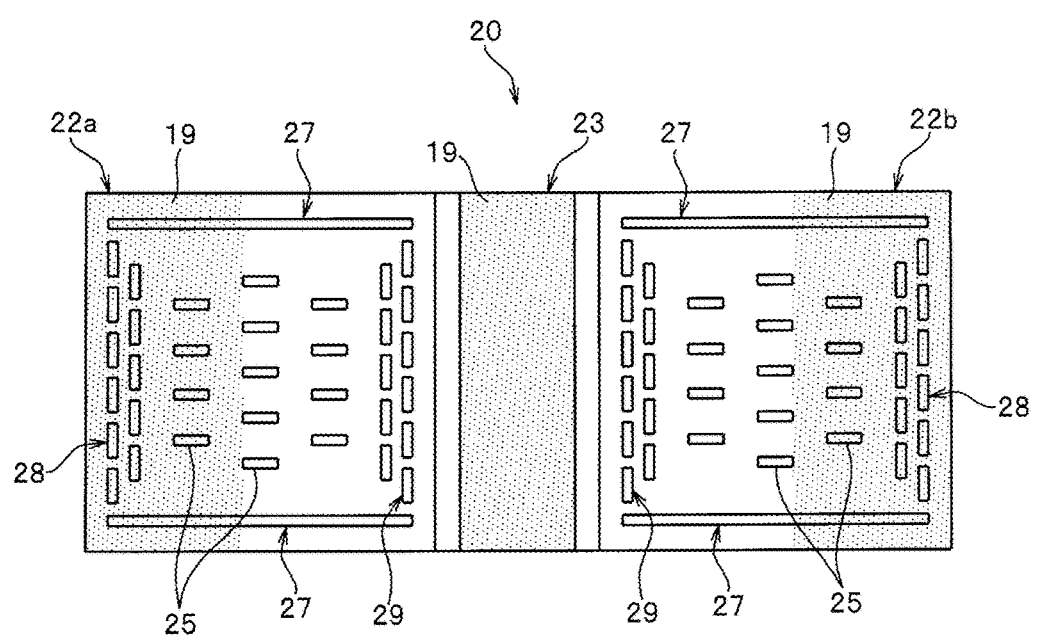
FIG. 4 is an explanatory view illustrating a modification embodiment of a region in which magnetic particles are mixed.
Figure 5:
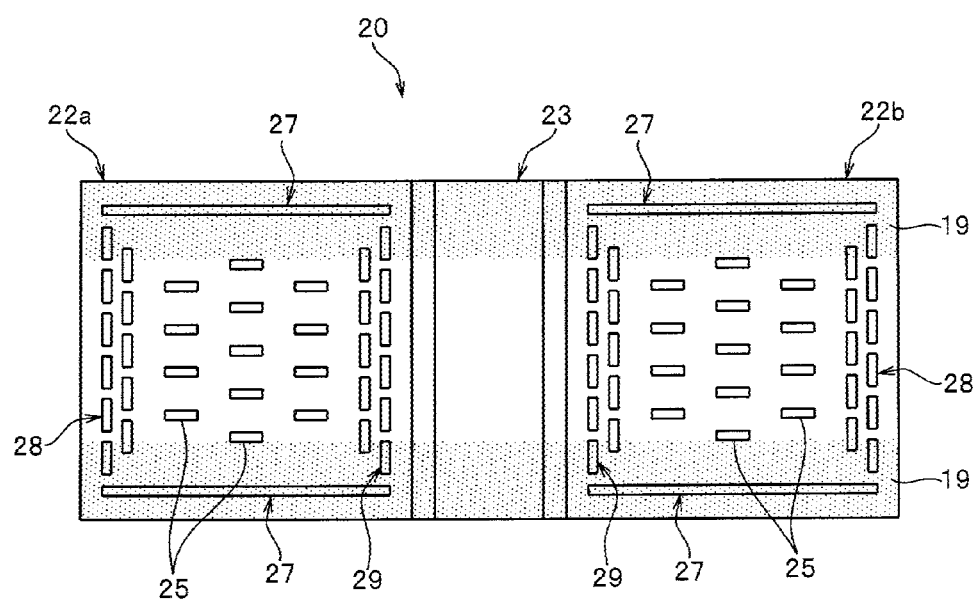
FIG. 5 is an explanatory view illustrating another modification embodiment of a region in which magnetic particles are mixed.

As shown in FIG. 4, for example, the mixed region 19 of the magnetic particles can be set only at the outer side end edge portion of the first and the second surface fastener portions 22a, 22b and the base portion 23a of the foldable piece portion 23 in an entire length direction, or set only at a region of the outer side end edge portion of the first and the second surface fastener portions 22a, 22b in an entire length direction. Alternately, as shown in FIG. 5, the mixed region 19 of the magnetic particles can be set only at the front end edge portion and the rear end edge portion of the surface fastener member 20 in an entire width direction.

It should be noted that the magnetic particles disposed at the foldable piece portion 23 and the magnetic particles disposed at the surface fastener portions 22a, 22b have different mixing purposes. That is, the magnetic particles disposed at the foldable piece portion 23 are used as a positioning with respect to the holding portion, as mentioned later. On the other hand, the magnetic particles disposed at the surface fastener portions 22a, 22b are used to prevent the foam resin from flowing in the engaging element region. Therefore, it is preferable that the magnetic particles disposed at the foldable piece portion 23 are disposed symmetrically about a center in a width direction of the base portion 23a between the hinge portions 23b. It is also preferable that the magnetic particles disposed at the surface fastener portions 22a, 22b are disposed at respective barrier portions or the substrate portion 24 just under the respective barrier portions. Further, when the magnetic particles are partially disposed at the surface fastener portions 22a, 22b, it is preferable to dispose more magnetic particles at an outer side than a center side in a width direction of the surface fastener portions 22a, 22b.

Since the magnetic particles are mixed in a part of a region of the surface fastener members 20, the surface fastener members 20 can be stably attracted and fixed to the fastener holding portion 15a of the molding die 15, and the mixing proportion of the magnetic particles mixed in the respective surface fastener members 20 can be reduced, which results in an improvement of strength of the molded surface fastener 1 and a reduction of production cost. It should be noted that the magnetic material does not have to be a particle, and for example, a metal plate, a metal wire or a metal piece having a magnetic attraction and formed of an alloy of iron, cobalt or nickel may be fixed by bonding to a part of the surface fastener member.

The molded surface fastener 1 in Embodiment 1 having the above structural features is manufactured using a production device as below, for example.

Specifically, a production device of the molded surface fastener 1 includes, although not shown in the drawings, a die wheel motor-rotating in one direction, a continuous extrusion nozzle for molten resin material disposed to face a peripheral surface of the die wheel, a pick-up roll disposed to face the peripheral surface of the die wheel on a side of a downstream of the continuous extrusion nozzle in the die wheel rotation direction, a connecting member supply portion disposed on a side of an upstream of the continuous extrusion nozzle in the die wheel rotation direction and introducing the connecting member 21 between the die wheel and the continuous extrusion nozzle and a cutting portion cutting a long piece of the molded surface fastener peeled off from the peripheral surface of the die wheel at a predetermined length.

A molding cavity is formed on the peripheral surface of the die wheel of the production device to mold a hook-shaped engaging element 25, the first barrier portions 27 to the third barrier portion 29 and others of the surface fastener member 20. The die wheel distributes coolant inside the die wheel, and a coolant bath to impregnate a lower half part of the die wheel is disposed at a lower part of the die wheel.

When the molded surface fastener 1 of the Embodiment 1 is manufactured using such a production device, first, a molten resin material is extruded toward a peripheral surface of the die wheel from the continuous extrusion nozzle. At the time, the die wheel is motor-rotating in one direction, and the substrate portion 24 of the first and the second surface fastener portions 22a, 22b and the base portion 23a of the foldable piece portion 23 of the molded surface fastener 1 are molded by the molten resin material extruded to the peripheral surface between the continuous extrusion nozzle and the die wheel, and the engaging element 25 and the first barrier portion 27 to the second barrier portion 28 and others are serially molded at the above-mentioned molding cavity.

At the time the molten resin material is extruded from the continuous extrusion nozzle, one connecting member 21 is supplied from the connecting member supply portion to an extrusion position of the molten resin, and fixed to the fixing portion 23c formed on a side of a lower surface (second surface) of the foldable piece portion 23.

Respective surface fastener members 20 provided with the first and the second surface fastener portions 22a, 22b and the foldable piece portion 23 which are molded on the peripheral surface of the die wheel are solidified by rotating while being supported on the peripheral surface of the die wheel and cooled. Then, respective surface fastener members 20 are continuously peeled off from the peripheral surface of the die wheel by the pick-up roll while being fixed to the connecting member 21.

A long piece of the molded surface fastener peeled off from the die wheel is conveyed to the cutting portion and cut at a predetermined length at the cutting portion. At this time, the long piece of the molded surface fastener is cut at a part by the cutting portion in which the connecting member 21 is exposed. Thus, the molded surface fastener 1 according to Embodiment 1 having a predetermined length as shown in FIG. 1 is manufactured.

It should be noted that a production device and a production method of the molded surface fastener 1 of the present invention is not limited, and can be randomly changed. For example, after the long piece of molded surface fastener is peeled off from the peripheral surface of the die wheel, the obtained long piece of molded surface fastener can be collected by winding in a rolled shape in the long state without being cut at the cutting portion.

The molded surface fastener 1 of Embodiment 1 manufactured as the above is, for example, integrated to the groove portion for fixing a skin material 10a, as mentioned later, of the cushion body 10 by molding (two-color molding) at the time a cushion body (foaming body) 10 such as a seat of an automobile is foaming molded.

Specifically, the molded surface fastener 1 of Embodiment 1 having a predetermined length is prepared as mentioned above, and the molding die 15 to perform foam molding of the cushion body 10 is prepared. The prepared molding die 15 has a cavity space corresponding to a shape of the cushion body 10 to be molded.

Figure 6:
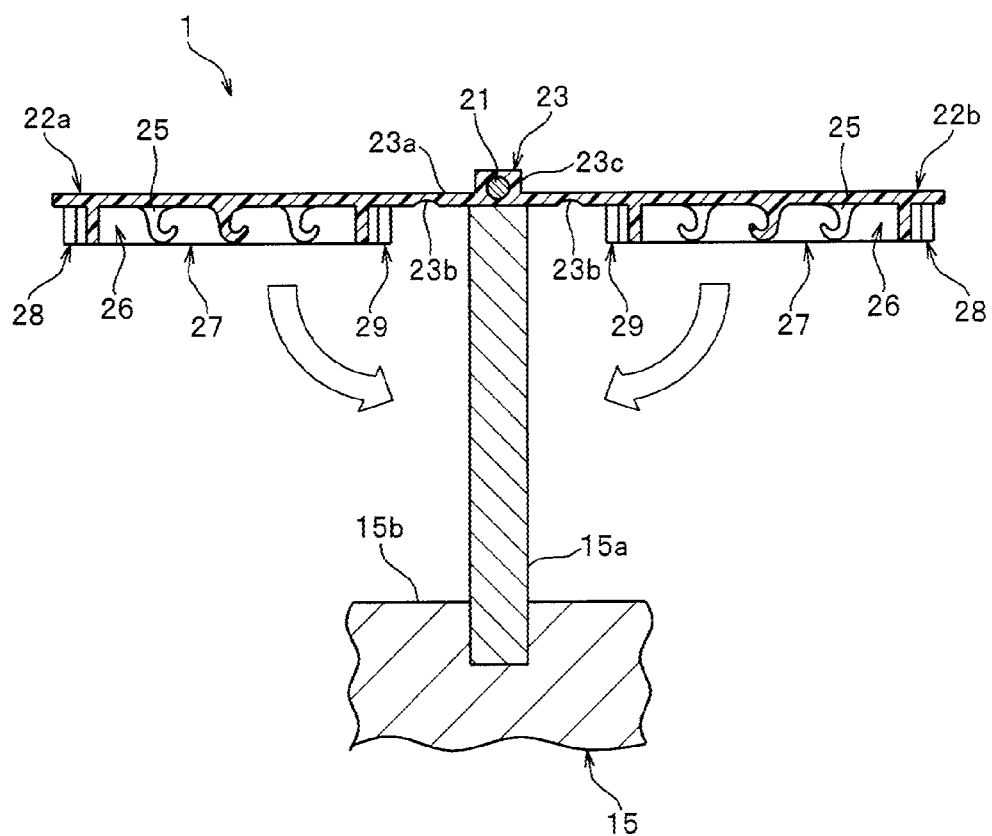
FIG. 6 is an explanatory view illustrating an operation of attaching the molded surface fastener to a fastener holding portion of a molding die.

In the Embodiment 1, the groove portion for fixing a skin material 10a is formed in which an engaged insertion piece portion 12, as mentioned later, of a skin material 11 can be inserted, and the molded surface fastener 1 is fixed at a side wall portion and a groove bottom portion of the groove portion for fixing the skin material 10a (see FIG. 8, for example). In this case, the fastener holding portion 15a is provided in the molding die 15, as shown in FIG. 6, for example, so as to be projected in the cavity space from the cavity surface (inner wall surface) of the molding die 15 forming a surface (outer surface) of the cushion body 10, in order to form the groove portion for fixing the skin material 10a of the cushion body 10 and hold the molded surface fastener 1 at the time of foam molding of the cushion body 10.

The fastener holding portion 15a of the molding die 15 is formed of a magnet such as neodymium magnet. The fastener holding portion 15a is formed long in the length direction according to a shape of the groove portion for fixing the skin material 10a. Further, the fastener holding portion 15a has a flat top end surface (tip end surface) and left and right flat side wall surfaces bent from left and right side edges of the top end surface and perpendicular to the top end surface such that a cross section of a part projected from the cavity surface 15b has a rectangular shape.

When the molded surface fastener 1 is held at the fastener holding portion 15a of the molding die 15, as mentioned later, the top end surface of the fastener holding portion 15a forms a first holding portion holding the foldable piece portion 23 of the molded surface fastener 1, and the left and right side wall surfaces of the fastener holding portion 15a form second holding portions holding the first and the second surface fastener portions 22a, 22b of the molded surface fastener 1.

The first holding portion and the second holding portions respectively have an attractive surface which can be magnetically attracted, and the top end surface (attractive surface) of the first holding portion and the side wall surfaces (attractive surfaces) of the second holding portions are formed as a flat surface. Since the fastener holding portion 15a has a simple shape without a concave or others on its surface, an increase in production cost of the molding die 15 can be suppressed.

Further, washing operation of the molding die 15 after foam molding of the cushion body 10 can be prevented from being complicated, and time for the washing operation can be reduced. As a result, a production process of the cushion body 10 can be efficient, and the production cost can be reduced.

In a case that the magnetic particles are not mixed in the foldable piece portion 23 of the fastener holding portion in the present invention, as mentioned later, the magnetic attractive surface is not necessary to be provided in the first holding portion as long as the magnet is placed in the second holding portions (both side wall surfaces) to which the surface fastener portions 22a, 22b are disposed so that the attractive force can work.

When the molded surface fastener 1 of Embodiment 1 is attached to the fastener holding portion 15a of the molding die 15, first, the molded surface fastener 1 of Embodiment 1 is moved close to the fastener holding portion 15a in a state that the first and the second surface fastener portions 22a, 22b are open left and right (i.e. a state that the first and the second fastener portions 22a, 22b are not folded or a little folded with respect to the foldable piece portion 23), and the base portion 23a of the foldable piece portion 23 of the molded surface fastener 1 is set on a top end surface of the fastener holding portion 15a. Then, the magnetic particles mixed in the molded surface fastener 1 are attracted to the magnet of the fastener holding portion 15a, and the base portion 23a of the foldable piece portion 23 is attracted and fixed to the top end surface of the fastener holding portion 15a which is the first holding portion.

At that time, the magnetic force between the magnetic particles mixed in the base portion 23a of the foldable piece portion 23 and the magnet of the fastener holding portion 15a is utilized, and a self-alignment effect by which a position of the foldable piece portion 23 of the molded surface fastener 1 can be adjusted to a predetermined position along the fastener holding portion 15a. Particularly, since the molded surface fastener 1 of Embodiment 1 can be bent in a left and right direction at a part where the connecting member 21 is exposed, when the fastener holding portion 15a of the molding die 15 is formed in a curved manner in a width direction, for example, the molded surface fastener 1 can be automatically curved along the curved fastener holding portion 15a while the foldable piece portion 23 of the molded surface fastener 1 can be held on the top end surface of the fastener holding portion 15a by utilizing the above magnetic force.

Figure 7:
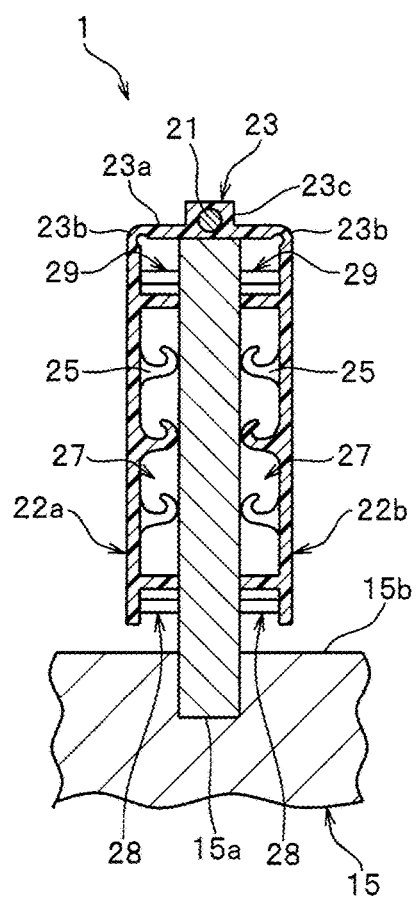
FIG. 7 is a schematic view illustrating a state that the molded surface fastener is held at the fastener holding portion of the molding die.

As mentioned above, at the time or after the base portion 23a of the foldable piece portion 23 is fixed on the top end surface of the fastener holding portion 15a, the first and the second fastener portions 22a, 22b parted in a left and right direction of the molded surface fastener 1 are automatically folded so as to move close to the fastener holding portion 15a centering the hinge portion 23b of the foldable piece portion 23 with respect to the base portion 23a of the foldable piece portion 23, by the magnetic particles mixed in the first and the second surface fastener portions 22a, 22b being attracted to the magnet of the fastener holding portion 15a, and are attracted and fixed to the left and right side wall surfaces of the fastener holding portion 15a, as shown in FIG. 7.

At this time, an upper surface of the base portion 23a of the foldable piece portion 23 in the molded surface fastener 1 is closely contacted with the top end surface of the fastener holding portion 15a, and respective upper surfaces of the engaging elements 25 and the first barrier portions 27 to the third barrier portion 29 of the first and the second surface fastener portions 22a, 22b are held at the fastener holding portion 15a in a state closely contacting with side wall surfaces of the fastener holding portion 15a. That is, in the present invention, the foldable piece portion 23 of the molded surface fastener 1 is set on the top end surface of the fastener holding portion 15a, and the molded surface fastener 1 can be held at the fastener holding portion 15a in a predetermined close contacting state by utilizing the magnetic force between the molded surface fastener 1 and the fastener holding portion 15a.

Thus, attaching operation of the molded surface fastener 1 to the molding die 15 can be performed efficiently, and the operating burden in the molding of the cushion body 10 and a cost burden along the operation can be alleviated. Further, the above also prevents to form a gap through which foam resin material can pass between the respective upper surfaces of the first barrier portions 27 to the third barrier portion 29 of the first and the second surface fastener portions 22a, 22b and left and right side wall surfaces of the fastener holding portion 15a, and the engaging region 26 of the first and the second surface fastener portions 22a, 22b can be blocked by the side wall surfaces of the fastener holding portion 15a and the first barrier portions 27 to the third barrier portion 29.

Further, since the base portion 23a of the foldable piece portion 23 is closely contacted with the top end surface of the fastener holding portion 15a, a position of the molded surface fastener 1 with respect to the fastener holding portion 15a (particularly, a height position of the molded surface fastener 1 in the vertical direction of the fastener holding portion 15a) can be precisely adjusted. Therefore, the molded surface fastener 1 can be stably placed at a predetermined position in a groove depth direction with respect to the groove portion for fixing the skin material 10a formed on the cushion body 10 by the fastener holding portion 15a.

In Embodiment 1, the molded surface fastener 1 is held at the fastener holding portion 15a at a position where the first and the second surface fastener portions 22a, 22b are separated from the cavity surface 15b of the molding die molding a surface of the cushion body 10 with a little distance. Therefore, a gap around which the foam resin material can flow is formed between the substrate portions 24 and the second barrier portions 28 of the first and the second surface fastener portions 22a, 22b and the cavity surface 15b of the molding die 15 molding the surface of the cushion body 10.

Since the foam resin material flows around such a gap and solidify at the time of foam molding, the molded surface fastener 1 can be prevented from exposing on a surface of the cushion body 10 to be foaming molded, and texture on a surface of the cushion body 10 can be improved. A contacting area of the molded surface fastener 1 with the cushion body 10 can also be enlarged, and fixing strength of the molded surface fastener 1 and the cushion body 10 can be enhanced.

Then, after the molded surface fastener 1 of Embodiment 1 is held at the fastener holding portion 15a as above, a foam resin material is sprayed into the molding die 15 from a spray nozzle, which is not shown in the drawings. At this time, the foam resin material is sprayed while the spray nozzle is relatively moved with respect to the molding die 15, and the foam resin material can be injected throughout the cavity space of the molding die 15. Further, after a predetermined amount of the foam resin material is sprayed from the spray nozzle, the molding die 15 is clamped. Then, the foam resin material foams and spreads throughout the cavity space of the molding die 15, and the cushion body 10 is molded.

At this time, the molded surface fastener 1 is positioned and fixed at a predetermined position by an attractive force of the magnet forming the fastener holding portion 15a. Therefore, the position of the molded surface fastener 1 is unmoved by a flowing pressure or a foaming pressure of the foam resin material. Further, a state that respective upper surfaces of the first barrier portions 27 to the third barrier portion 29 of the first and the second surface fastener portions 22a, 22b are closely contacted with the side wall surfaces of the fastener holding portion 15a is maintained, and it can be prevented that a gap through which the foam resin material can pass is formed between these upper surfaces and the fastener holding portion 15a. Therefore, penetration of the foam resin material flowing inside of the cavity space into the engaging region 26 beyond the first barrier portions 27 to the third barrier portion 29 of the first and the second surface fastener portions 22a, 22b can be prevented.

The vertical wall bodies 28c constituting the inner side barrier row 28a and the outer side barrier row 28b of the second barrier portion 28 in Embodiment 1 are disposed intermittently along a length direction, as mentioned above, and small gaps are formed between respective vertical wall bodies 28c. However, these gaps are small, and the vertical wall bodies 28c of the inner side barrier row 28a and the vertical wall bodies 28c of the outer side barrier row 28b are disposed to be staggered each other by staggering the positions in the length direction.

Thus, even if the foam resin material is flew in the gaps formed between the vertical wall bodies 28c of the second barrier portion 28 at the time of foam molding, they are cooled and solidified before penetrating into the engaging region 26, and the arrival of the foam resin material in the engaging region 26 beyond the second barrier portion 28 can be prevented. In this case, the foam resin material is solidified, for example, in a state penetrating into a region beyond the outer side barrier row 28b of the second barrier portion 28, and the outer side barrier row 28b of the second barrier portion 28 are buried in the cushion body 10, which enhances a fixing strength of the molded surface fastener 1 with respect to the cushion body 10.

Further, small gaps are also formed between the vertical wall bodies 29c constituting the inner side barrier row 29a and the outer side barrier row 29b of the third barrier portion 29 in the molded surface fastener 1 of Embodiment 1. However, similar to the second barrier portion 28, the vertical wall bodies 29c of the inner side barrier row 29a and the vertical wall bodies 29c of the outer side barrier row 29b are disposed to be staggered each other. In addition, the foldable piece portion 23 is formed at an end edge portion on a side of the third barrier portion 29 of the first and the second surface fastener portions 22a, 22b, and the foldable piece portion 23 is closely contacted with the top end surface of the fastener holding portion 15a in a folded state with respect to the first and the second surface fastener portions 22a, 22b.

For the reason, the foam resin material does not reach the third barrier portion 29 unless it flows around between the first barrier portions 27 and the foldable piece portion 23 in the front end edge portion or the rear end edge portion of the first and the second surface fastener portions 22a, 22b. Further, even if the foam resin material flows around and reaches the third barrier portion 29, it is cooled and solidified before penetrating into the engaging region 26 from a gap between respective vertical wall bodies 29c, and the foam resin material can be prevented from reaching the engaging region 26 beyond the third barrier portion 29.

An amount of the foam resin material reaching the third barrier portion 29 is changed depending on viscosity of the foam resin material, a length dimension in a front and rear direction of the first and the second surface fastener portions 22a, 22b and a size of a gap between respective surface fastener portions continuing in the front and rear direction.

In Embodiment 1, a fixing strength between the cushion body 10 and the surface fastener member 20 can be rather improved if the foam resin material reaches the third barrier portion 29, or at least portion of the foam resin material penetrates between the third barrier portion 29 and the foldable piece portion 23.

Figure 8:
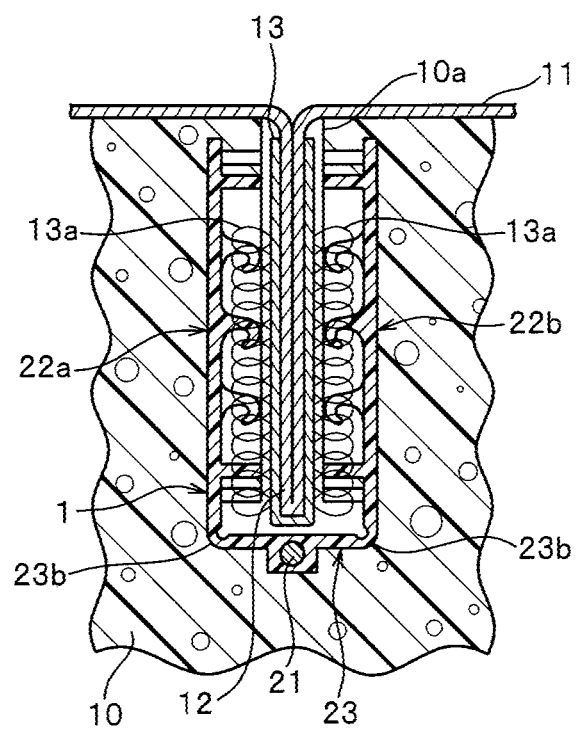
FIG. 8 is a cross-sectional view illustrating a main part of a product in which a skin material is attached to a cushion body integrating the molded surface fastener.

Thereafter, the foam resin material is foamed and solidified in the cavity space of the molding die 15 and the molding is completed, and the cushion body 10 to which the molded surface fastener 1 of Embodiment 1 is integrated, as shown in FIG. 8, can be obtained. In FIG. 8, the cushion body 10 obtained from a state of FIG. 7 is shown in upside-down direction.

In thus obtained cushion body 10, the groove portion for fixing the skin material 10a to which an engaged insertion piece portion 12 provided on the skin material 11 can be inserted is formed on a surface portion of the cushion body 10 at a predetermined position by the fastener holding portion 15a, and the molded surface fastener 1 is fixed and integrated in the groove portion for fixing the skin material 10a of the cushion body 10.

In this case, the foldable piece portion 23 of the molded surface fastener 1 is disposed at a groove bottom portion of the groove portion for fixing the skin material 10a, and the first and the second surface fastener portions 22a, 22b of the molded surface fastener 1 are disposed on facing left and right side wall portions of the groove portion for fixing the skin material 10a in a state that respective engaging regions 26 are exposed so as to face each other in an inner direction.

In the molded surface fastener 1 of Embodiment 1, in particular, the penetration of the foam resin into the engaging region 26 of the first and the second surface fastener portions 22a, 22b are blocked at the first barrier portions 27 to the third barrier portion 29. Therefore, the foam resin does not penetrate into the engaging region 26, and a plurality of engaging elements 25 disposed on upper surfaces of the first and the second surface fastener portions 22a, 22b are exposed completely. Thus, a desired engaging force can be secured by the plurality of the engaging elements 25 in the engaging regions 26 of the first and the second surface fastener portions 22a, 22b.

Further, in the molded surface fastener 1 of Embodiment 1, the connecting member 21 connecting the respective surface fastener members 20 are buried in the cushion body 10 in a region between the surface fastener members 20, and the fixing strength of the molded surface fastener 1 to the cushion body 10 can be further enhanced.

Meanwhile, the skin material 11 covering a surface of the cushion body 10 in Embodiment 1 has an engaged inserted piece portion 12 which can be inserted into the groove portion for fixing the skin material 10a of the cushion body 10, and the female engaging member 13 having a plurality of loop-shaped engaging elements 13a is attached to the engaged inserted piece portion 12.

The loop-shaped engaging elements 13a of the female engaging members 13 attached to the engaged inserted piece portion 12 are separately provided in regions of left and right side surface portions of the engaged inserted piece portion 12 so as to correspond to positions of the engaging regions 26 of the molded surface fastener 1 disposed at the groove portion for fixing the skin material 10a of the cushion body 10. Therefore, at a tip end part of the engaged insertion piece portion 12 between two engaged regions having the loop-shaped engaging elements 13a of the female engaging members 13, non-engaged region without having loop-shaped engaging elements is formed.

In Embodiment 1, a part in which the engaged insertion piece portion 12 of the skin material 11 is provided is formed as a mock sewn portion which is formed like a sewn-together portion of a base cloth by sewing the female engaging member 13 with the base cloth which is partially folded and overlaid. The engaged insertion piece portion 12 of the skin material 11 may be formed as a connected sewn portion by sewing two base cloths and the female engaging member 13 together in a state that, for example, respective end edge portions of the two base cloths are overlaid.

In Embodiment 1, the foaming molded cushion body 10 is covered with the skin material 11 having the engaged insertion piece portion 12 in which such loop-shaped engaging elements 13a are disposed, and the engaged insertion piece portion 12 of the skin material 11 is inserted to the groove portion for fixing the skin material 10a of the cushion body 10.

At that time, respective hook-shaped engaging elements 25 of the molded surface fastener 1 provided at the groove portion for fixing the skin material 10a of the cushion body 10 are disposed to extend their hook portions at the tip end portions only to a side of the groove bottom portion of the groove portion for fixing the skin material 10a.

Therefore, it is possible that the engaged insertion piece portion 12 of the skin material 11 is inserted easily and smoothly to a predetermined depth of the groove portion for fixing the skin material 10a without catching respective loop-shaped engaging elements 13a of the engaged piece portion 12 being caught with the hook-shaped engaging elements 25 of the molded surface fastener 1.

In this case, the second barrier portions 28 of the molded surface fastener 1 are disposed near an opening mouth portion of the groove portion for fixing the skin material 10a of the cushion body 10. Therefore, the engaged insertion piece portion 12 of the skin material 11 can be stably inserted to a predetermined depth of the groove portion for fixing the skin material 10a with the second barrier portions 28 serving as a mark.

In the molded surface fastener 1 of Embodiment 1, the second barrier portion 28 of the first and the second surface fastener portions 22a, 22b is disposed in a direction perpendicular to the substrate portion 24. The engaged insertion piece portion 12 of the skin material 11 can be inserted into the groove portion for fixing the skin material 10a more easily by, for example, providing the second barrier portion 28 of the first and the second surface fastener portions 22a, 22b in a sloped or a curved manner with respect to the substrate portion 24 so that a tip end portion (upper end portion) of the second barrier portion 28 is disposed closer to a side of the engaging region 26 than the base end portion (lower end portion).

And when the engaged insertion piece portion 12 of the skin material 11 is inserted into a predetermined depth of the groove portion for fixing the skin material 10a, respective loop-shaped engaging elements 13a of the engaged insertion piece portion 12 are engaged with respective engaging regions 26 (hook-shape engaging elements 25) of the first and the second surface fastener portions 22a, 22b of the molded surface fastener 1, and the engaged insertion piece portion 12 can be fixed to the molded surface fastener 1 in the groove portion for fixing the skin material 10a.

In this case, as the hook portions of the respective hook-shape engaging elements 25 extend only to a side of the groove bottom portion of the groove portion for fixing the skin material 10a, they can be firmly engaged with the loop-shaped engaging elements 13a against an exit direction of the engaged insertion piece portion 12, and the engaged insertion piece portion 12 can be firmly fixed to a side wall portion of the groove portion for fixing the skin material 10a.

Therefore, the skin material 11 can be stably held at a predetermined position of the cushion body 10, and it can be prevented that the skin material 11 is lifted from the cushion body 10, and a position of the skin material 11 with respect to the cushion body 10 is moved. Thus the skin material 11 can be appropriately attached to the cushion body 10 along a surface thereof, and the attachment of the skin material 11 can be stably maintained.

Further, in Embodiment 1, a groove width of the groove portion for fixing the skin material 10a formed on the cushion body 10 can be narrowly formed while an engaging force can be appropriately secured by the first and the second surface fastener portions 22a, 22b of the molded surface fastener 1 fixed at a side wall portion of the groove portion for fixing the skin material 10a. Therefore, the mock sewn portion (or the connected sewn portion) appeared on a surface of the skin material 11 can be shown narrowly and clearly, and an appearance of a product to which the skin material 11 is attached to the cushion body 10 is improved, which enhances quality of an outer appearance of the product.

As mentioned above, the third barrier portion 29 stand at an end edge portion of the substrate portion 24 on a side of the foldable piece portion 23 in the first and the second surface fastener portions 22a, 22b of the molded surface fastener 1 in Embodiment 1. However, as shown in a modification embodiment of Embodiment 1 in FIG. 9, for example, it is possible to form the molded surface fastener 1a without the third barrier portion 29.

Figure 9:
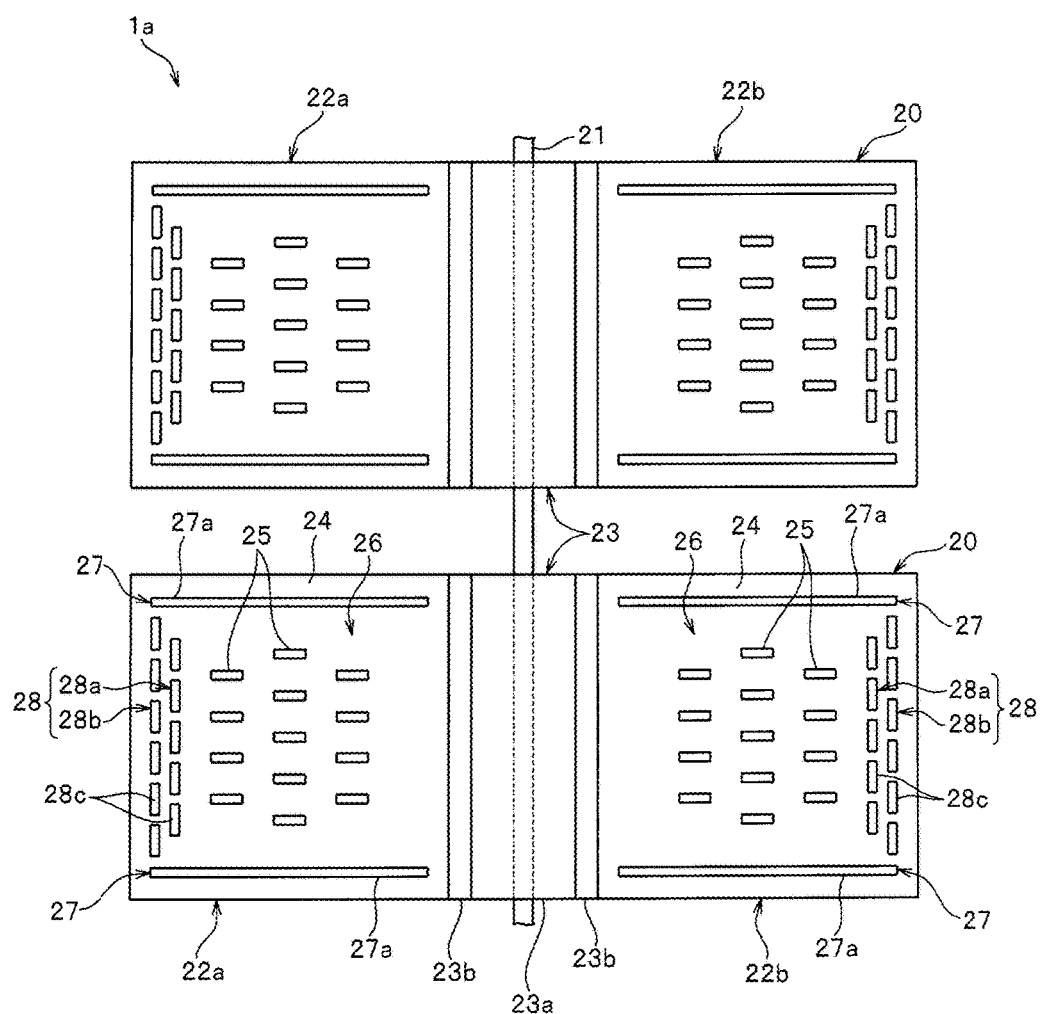
FIG. 9 is a plan view illustrating a molded surface fastener according to a modification embodiment in Embodiment 1.
Figure 10:
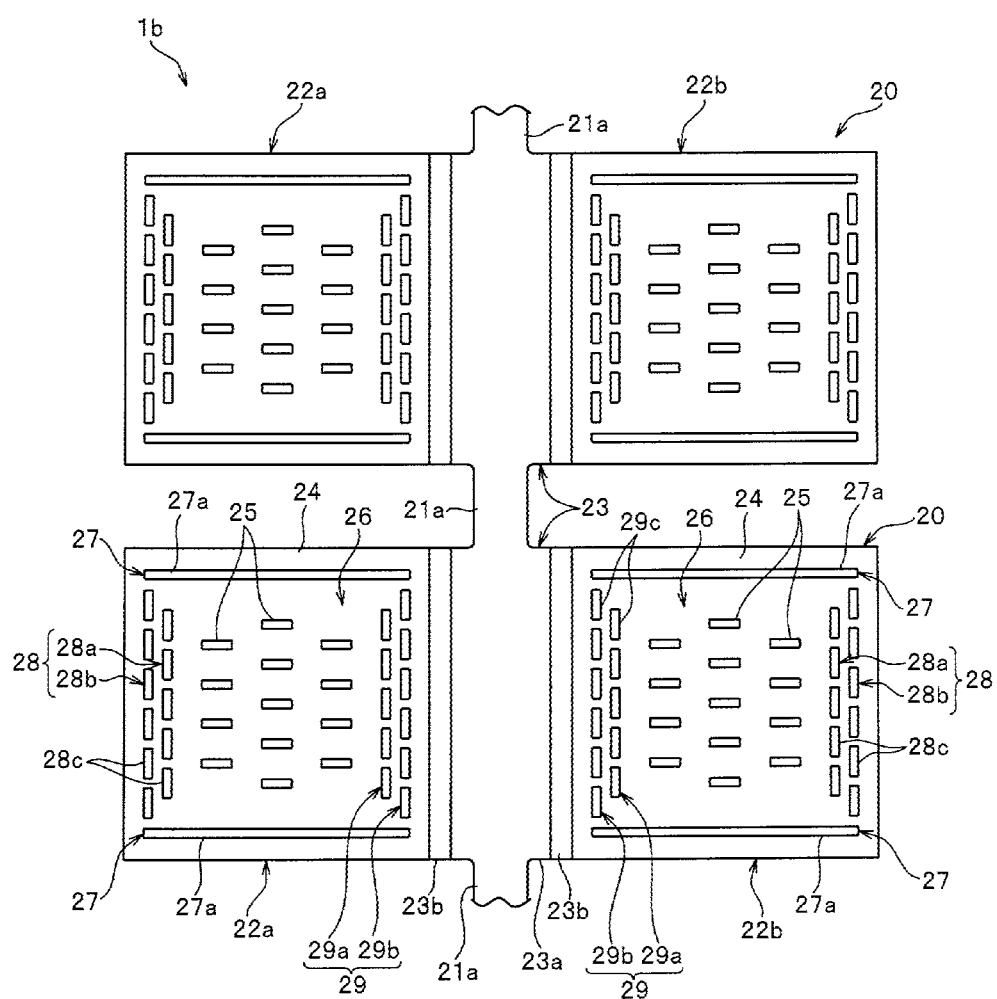
FIG. 10 is a plan view illustrating a molded surface fastener according to another modification embodiment of Embodiment 1.

In FIG. 9 and FIG. 10, as described later, explanations of portions and members formed similar to those of the molded surface fastener 1 of Embodiment 1 will not be described but represented by the same reference numerals.

When the molded surface fastener 1a where the third barrier portion 29 is removed as shown in FIG. 9 is held at the fastener holding portion 15a of the molding die 15 as explained in Embodiment 1 using a magnetic force, for example, the foldable piece portion 23 of the molded surface fastener 1a is closely contacted with the top end surface of the fastener holding portion 15a in a folded state with respect to the first and the second surface fastener portions 22a, 22b, and the upper surfaces of the first and the second barrier portions 27 and 28 of the molded surface fastener 1a are also closely contacted with the side wall surfaces of the fastener holding portion 15a.

If the foam resin material arrives at a region where the third barrier portion 29 is removed at the time of foam molding, it should flow into the region from between the first barrier portions 27 at the front end edge portion or the rear end edge portion of the first and the second surface fastener portions 22a, 22b and the foldable piece portion 23 to flow around the first barrier portions 27. However, when the foam resin material flows into the region where the third barrier portion 29 is removed by flowing around the first barrier portions 27, it is usually cooled and solidified before arriving at a part where the engaging elements 25 are disposed in the engaging region 26, depending on a kind of the foam resin material.

Thus, even if the third barrier portion 29 is not provided in the first and the second surface fastener portions 22a, 22b, as in the modification embodiment of the molded surface fastener 1a shown in FIG. 9, the penetration of the foam resin material into the engaging region 26 at the time of foam molding of the cushion body 10 can be suppressed by the first and the second barrier portions 27, 28 and the foldable piece portion 23, and the molded surface fastener 1a can be integrated to the cushion body 10 in a state that a plurality of hook-shape engaging elements 25 are exposed.

Further, in the molded surface fastener 1 of Embodiment 1, a plurality of surface fastener members 20 having the first and the second surface fastener portions 22a, 22b and the foldable piece portion 23 are connected with each other by a connecting member 21. However, in the present invention, as shown in another modification embodiment of Embodiment 1 in FIG. 10, for example, it is also possible that a molded surface fastener 1b is formed by connecting a plurality of surface fastener members 20 by a connecting portion 21a which is made of synthetic resin, formed integrally with the foldable piece portion 23 and has a narrow width, instead of the connecting member 21.

In this case, it is preferable that respective connecting portions 21a connecting the plurality of surface fastener members 20 have flexibility, and the molded surface fastener 1b is formed to be able to curve in a width direction or a height direction at the connecting portion 21a. Thereby, for example, even if the fastener holding portion 15a of the molding die 15 is formed to curve in a width direction, the molded surface fastener 1b can be stably held at the curved fastener holding portion 15a so as to curve along a curved shape of the fastener holding portion 15a.

Embodiment 2

Figure 11:
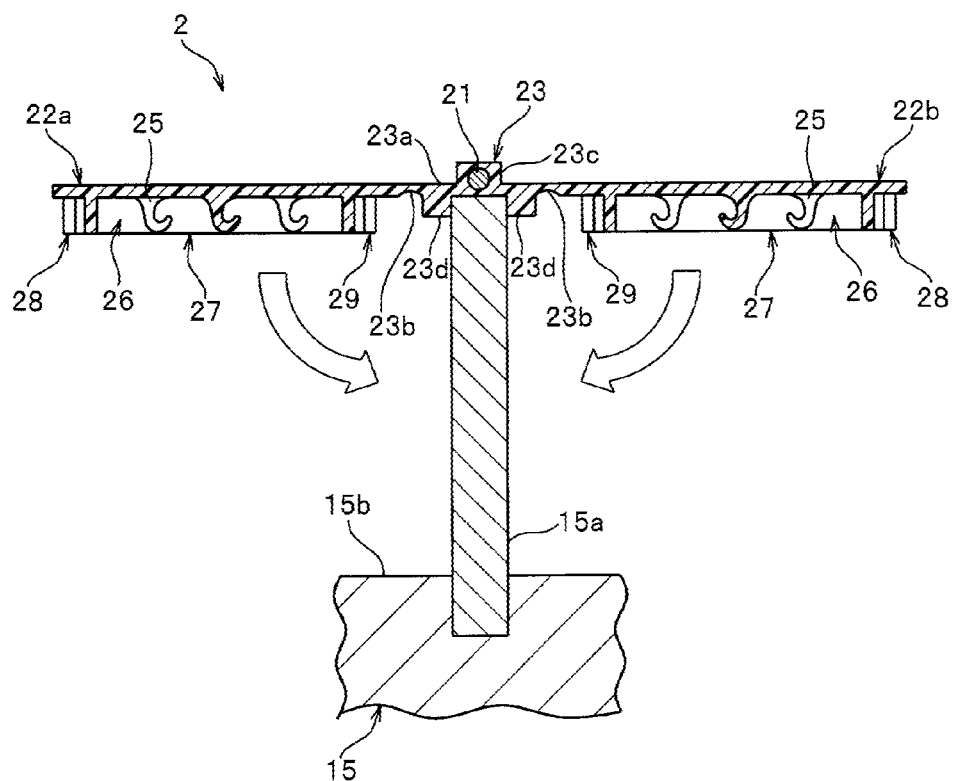
FIG. 11 is a schematic view illustrating a state that a molded surface fastener of Embodiment 2 is attached to a fastener holding portion of a molding die.

FIG. 11 shows a schematic view illustrating a state the molded surface fastener of Embodiment 2 is attached to the fastener holding portion of the molding die.

Please note that regarding the molded surface fastener of Embodiment 2 as mentioned below and the molded surface fasteners of Embodiments 3 to 9 described later, structural features different from the molded surface fastener of Embodiment 1 will be mainly described, and parts and members having substantially same as those of the molded surface fastener of Embodiment 1 will not be described but represented by the same reference numerals.

The molded surface fastener 2 according to Embodiment 2 has a plurality of surface fastener members 20 disposed along the length direction and a connecting member 21 fixed to respective surface fastener members 20.

Each surface fastener member 20 has a pair of left and right, first and second surface fastener portions 22a, 22b and a foldable piece portion 23 disposed between the pair of first and second surface fastener portions 22a, 22b.

The first and second surface fastener portions 22a, 22b are configured similar to the first and second surface fastener portions 22a, 22b of the Embodiment 1, as mentioned above.

The molded surface fastener 2 according to Embodiment 2 has, in addition to the structural features of the molded surface fastener 1 according to Embodiment 1 as above, a pair of projected portions for positioning 23d to determine a position of the molded surface fastener 2 with respect to the fastener holding portion 15a of the molding die 15 on an upper surface (first surface) of the foldable piece portion 23.

The pair of the projected portions 23d are disposed inside the hinge portions 23b of the foldable piece portion 23 along a length direction, and an interval between the pair of the projected portions 23d are set as substantially same as a dimension of the top end surface in a width direction of the fastener holding portions 15a of the molding die 15.

The pair of the projected portions 23d provided at the foldable piece portion 23 may be disposed in an entire area in the length direction of the foldable piece portion 23, or in a portion of the area in the length direction.

Since the molded surface fastener 2 according to Embodiment 2 has the pair of the projected portions for positioning 23d, when the molded surface fastener 2 is held at the fastener holding portion 15a of the molding die 15 which is configured similar to the above-mentioned Embodiment 1, the positioning of the molded surface fastener 2 with respect to the fastener holding portion 15a can be performed more stably and certainly by fitting the top end portion of the fastener holding portion 15a between the pair of the projected portions 23d provided at the foldable piece portion 23 and placing the foldable piece portion 23 on the fastener holding portion 15a.

Also, since the molded surface fastener 2 has the projected portion for positioning 23d in the foldable piece portion 23, even if magnetic particles are not mixed in the foldable piece portion 23, for example, the positioning of the molded surface fastener 2 with respect to the fastener holding portion 15a can be performed easily. As a result, in the molded surface fastener 2 of Embodiment 2, the foldable piece portion 23 can be formed without mixing the magnetic particles. Therefore, material cost of the molded surface fastener 2 can be reduced than those of the molded surface fastener 1 of Embodiment 1, as mentioned above, and a strength of the foldable piece portion 23 can be enhanced.

The foldable piece portion 23 of Embodiment 2 can also be formed mixing the magnetic particles, and a self-alignment effect, as mentioned above, can be obtained by mixing the magnetic particles when the molded surface fastener 2 is held at the fastener holding portion 15a.

Further, in the molded surface fastener 2 of Embodiment 2, after the foldable piece portion 23 is placed on the top end portion of the fastener holding portion 15a, as mentioned above, the first and the second surface fastener portions 22a, 22b of the molded surface fastener 2 in which the magnetic particles are mixed are attracted to a magnet of the fastener holding portion 15a, are automatically folded with respect to the base portion 23a of the foldable piece portion 23 centering the hinge portion 23b of the foldable piece portion 23 so as to approach the fastener holding portion 15a, and are attracted and fixed to the left and right wall surfaces of the fastener holding portion 15a.

Thus, the molded surface fastener 2 of Embodiment 2 is held at a predetermined position of the fastener holding portion 15a of the molding die 15 in a predetermined close contact state. Using such a molded surface fastener 2 of Embodiment 2 enables efficient attaching operation of the molded surface fastener 2 to the molding die 15, and an operation burden in the molding of the cushion body and a cost burden therewith can be reduced.

Further, when the molded surface fastener 2 is held at the fastener holding portion 15a, respective upper surfaces of the first barrier portions 27 to the third barrier portion 29 in the first and the second molded surface fastener portions 22a, 22b are closely contacted with the side wall surfaces of the fastener holding portion 15a. Therefore, formation of a gap through which the foam resin material can pass between these upper surfaces and the side wall surfaces of the fastener holding portion 15a can be prevented.

Thereafter, by spraying and injecting the foam resin material into the molding die 15 in which the molded surface fastener 2 is held at the fastener holding portion 15a, similar to Embodiment 1, a cushion body in which the molded surface fastener 2 is fixed to a predetermined position of the groove portion for fixing the skin material in a state that the engaging elements 25 of the first and the second surface fastener portions 22a, 22b are exposed can be manufactured. Thus manufactured cushion body of Embodiment 2 can have a similar effect as the cushion body 10 manufactured in the above-mentioned Embodiment 1.

Figure 12:
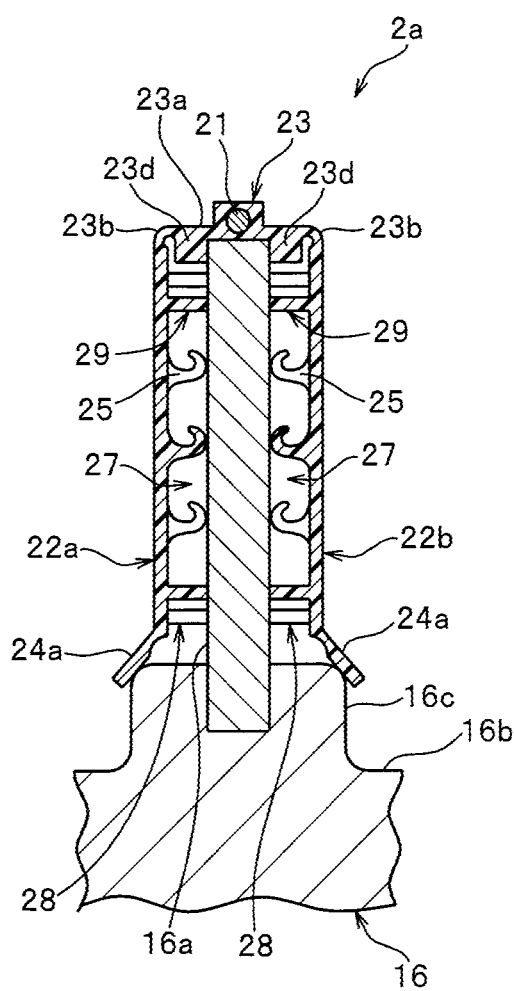
FIG. 12 is a schematic view illustrating a molded surface fastener according to a modification embodiment of Embodiment 2.

In the present invention, a molded surface fastener 2a can be formed by providing a pair of fin piece portions 24a further extending in a width direction from an end edge portion on an opposite side of the side of the foldable piece portion 23 of the first and the second surface fastener portions 22a, 22b, as shown in a modification embodiment of Embodiment 2 in FIG. 12. In this case, each fin piece portion 24a has a fin piece body portion having a predetermined thickness dimension and a hinge portion having flexibility and disposed between the fin piece body portion and the first fastener portion or the second fastener portion 22b.

In the molded surface fastener 2a according to the modification embodiment having such a pair of fin piece portions 24a, the molded surface fastener 2a is held at the fastener holding portions 16a of the molding die 16, and foam molding of the cushion body is performed. Then the molded surface fastener portions 2a can be integrated to the cushion body in a state that the fin piece portions 24a are buried in the cushion body after foam molding. Therefore, a contact area between the molded surface fastener 2a and the cushion body can be further increased, and a fixing strength of the molded surface fastener 2a to the cushion body can be increased.

When the molded surface fastener 2a having the fin piece portions 24a is integrated to the groove portion for fixing the skin material of the cushion body, the fin piece portions 24a of the molded surface fastener 2a serve as a guide portion to guide the engaged insertion piece portion 12 of the skin material 11 into the groove portion for fixing the skin material, and operability of attaching the skin material 11 to the cushion body can be improved.

In addition, when the foam molding of the cushion body is performed using the molded surface fastener 2a, a positioning effect of the molded surface fastener 2a with respect to the molding die 16 can be enhanced by using the molding die 16 as shown in FIG. 12, for example.

Specifically, a raised portion 16c is provided in the molding die 16 corresponding to a position forming the groove portion for fixing the skin material of the cushion body, and the raised portion 16c is disposed to project from a cavity surface 16b of the molding die 16 forming a surface of the cushion body. A fastener holding portion 16a formed of a magnet is fixed on a center part in a width direction of the raised portion 16c so as to project in the cavity space. The raised portion 16c and the fastener holding portion 16a are formed long in a length direction in accordance with a shape of the groove portion for fixing the skin material.

When the molded surface fastener 2a according to the modification embodiment of Embodiment 2 is held at the fastener holding portion 16a of the molding die 16, a positioning of the molded surface fastener 2a with respect to the fastener holding portion 16a can be stably performed by fitting a top end portion of the fastener holding portion 16a between a pair of the projected portions 23d provided at the foldable piece portion 23. After the foldable piece portion 23 is set on the top end portion of the fastener holding portion 16a, the first and the second surface fastener portions 22a, 22b of the molded surface fastener 2a are automatically folded by a magnetic force centering the hinge portion 23b of the foldable piece portion 23 so as to approach the fastener holding portion 16a, and attracted and fixed to the left and right side wall surfaces of the fastener holding portions 16a.

At the time, since the fin piece portions 24a provided at the first and the second surface fastener portions 22a, 22b are contacted to the raised portion 16c of the molding die 16, a position and a direction of the molded surface fastener 2a with respect to the molding die 16 can be further stabilized. Therefore, the molded surface fastener 2a can be stably integrated in a predetermined direction at a predetermined position of the groove portion for fixing the skin material of the cushion body.

The pair of fin piece portions 24a provided at the molded surface fastener 2a of the modification embodiment can also be provided to, for example, the molded surface fastener 1 of the above-mentioned Embodiment 1, or molded surface fasteners according to Embodiments 3 to 9, as described later.

Embodiment 3

Figure 13:
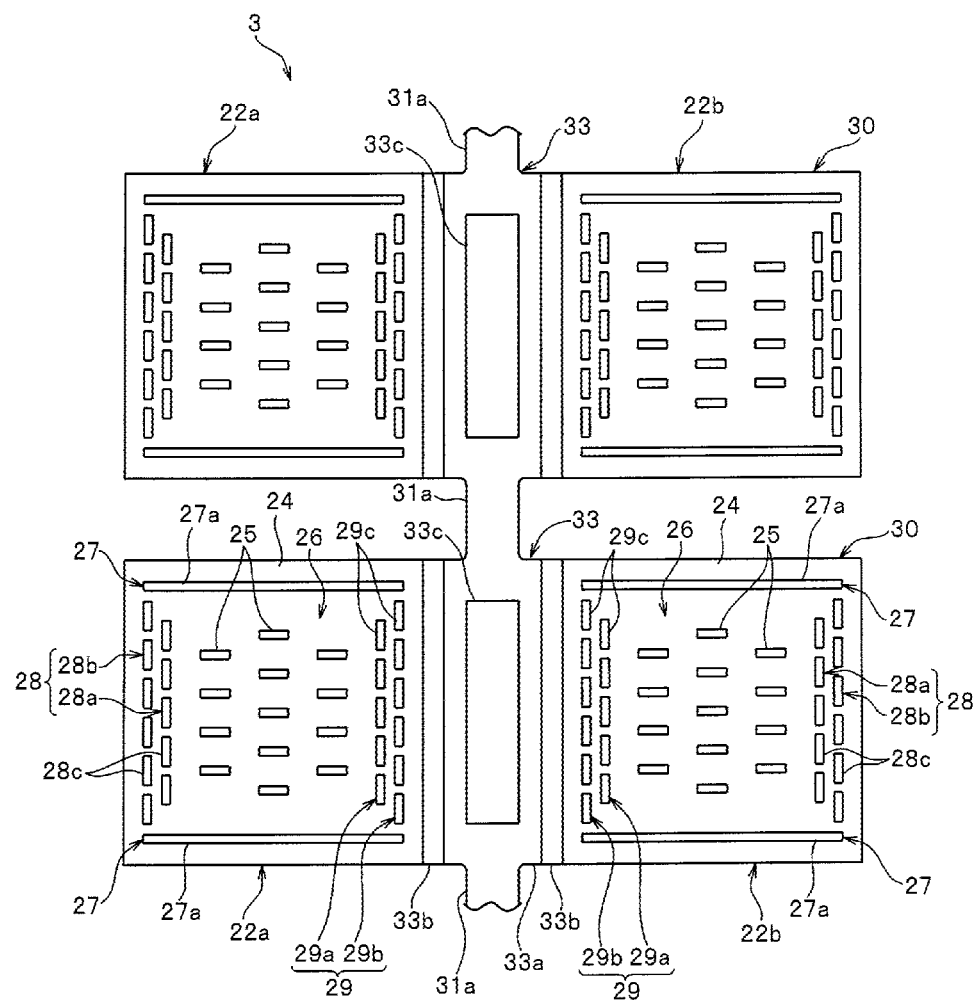
FIG. 13 is a plan view illustrating a molded surface fastener according to Embodiment 3 of the present invention.
Figure 14:
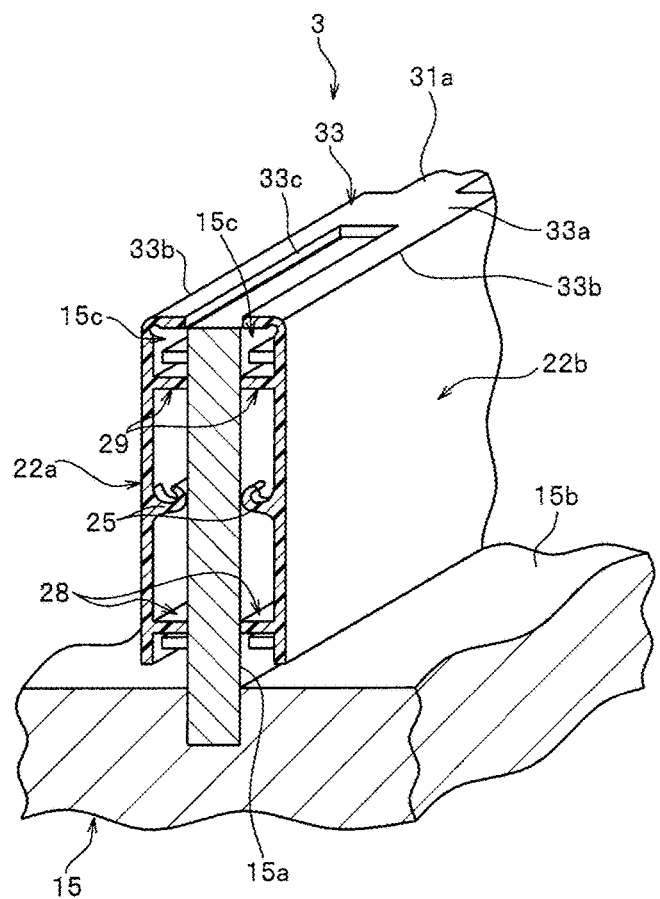
FIG. 14 is a perspective view illustrating a state that the molded surface fastener is held at a fastener holding portion of a molding die.

FIG. 13 shows a plan view illustrating a molded surface fastener according to Embodiment 3. FIG. 14 shows a perspective view illustrating a state that the molded surface fastener is held at a fastener holding portion of a molding die.

The molded surface fastener 3 according to Embodiment 3 is manufactured by molding a material in which magnetic particles are mixed in thermoplastic resin using a die wheel, and has a plurality of surface fastener members 30 disposed along a length direction and a connecting portion 31a formed integrally with the surface fastener members 30 and connecting respective surface fastener members 30. Each surface fastener member 30 has a pair of left and right first and second surface fastener portions 22a, 22b and a foldable piece portion 33 disposed between the pair of the first and the second surface fastener portions 22a, 22b.

The first and the second surface fastener portions 22a, 22b of Embodiment 3 are constituted similar to the first and the second surface fastener portions 22a, 22b of the above-mentioned Embodiment 1. The foldable piece portion 33 of Embodiment 3 is constituted to have a same dimension in a length direction as the substrate portion 24 of the first and the second surface fastener portions 22a, 22b.

The foldable piece portion 33 has a flat plate-shaped base portion 33a and a hinge portion 33b disposed at an end edge portion of the base portion 33a on a side of the first and the second surface fastener portions 22a, 22b. Further, a penetration hole 33c penetrating in a vertical direction is formed at a center part in a length direction and a width direction of the base portion 33a, and the base portion 33a itself has a frame-like shape. Since the penetrating hole 33c is formed at the base portion 33a of the foldable piece portion 33, the flexibility of the foldable piece portion 33 can be enhanced, and the foldable piece portion 33 can be configured to be easily bent.

When the molded surface fastener 3 according to Embodiment 3 is held at the fastener holding portion 15a of the molding die 15 which is configured similar to a case of the above-mentioned Embodiment 1, the base portion 33a of the foldable piece portion 33 of the molded surface fastener 3 is moved closer to a top end surface of the fastener holding portion 15a, then the magnetic particles mixed in the foldable piece portion 33 are attracted to a magnet of the fastener holding portion 15a, and the foldable piece portion 33 is attracted and fixed to the top end surface of the fastener holding portion 15a.

Further, after the foldable piece portion 33 is attracted and fixed to the fastener holding portion 15a, the first and the second surface fastener portions 22a, 22b of the molded surface fastener 3 in which the magnetic particles are mixed are attracted to the magnet of the fastener holding portion 15a, are automatically folded to approach the fastener holding portion 15a centering the hinge portion 33b of the foldable piece portion 33, and are attracted and fixed to the left and right side wall surfaces of the fastener holding portion 15a, as shown in FIG. 14.

In the molded surface fastener 3 according to Embodiment 3, the foldable piece portion 33 is configured to be easily bent by forming the penetration hole 33c in the base portion 33a of the foldable piece portion 33. Therefore, for example, in a case that the fastener holding portion 15a is formed to extend in a length direction and curve in a width direction, the molded surface fastener 3 can be more stably held at the fastener holding portion 15a in a state that the molded surface fastener 3 is curved at the foldable piece portion 33 and the connecting portion 31a so as to be along the curved shape of the fastener holding portion 15a.

In addition, since the penetration hole 33c is formed at the foldable piece portion 33, when the molded surface fastener 3 is held at the fastener holding portion 15a, a space portion 15c surrounded by the first surface fastener portion 22a or the second surface fastener portion 22b, the foldable piece portion 33 in the molded surface fastener 3 and the fastener holding portion 15a is connected to the cavity space of the molding die 15 through the penetration hole 33c of the foldable piece portion 33.

The foam resin material is injected to the molding die 15 in which the molded surface fastener 3 of Embodiment 3 is held at the fastener holding portion 15a to perform foam molding of the cushion body. With the above, the foam resin material penetrates into (flows around) the space portion 15c surrounded by the above through the penetration hole 33c of the foldable piece portion 33, foams and solidifies. Therefore, a part of the foldable piece portion 33 is buried in the foaming molded cushion body, which enhances fixing strength of the molded surface fastener 3 with respect to the cushion body.

Even if the foam resin material penetrates into the above-mentioned surrounded space at the time of foam molding of the cushion body, respective upper surfaces of the first barrier portions 27 to the third barrier portion 29 in the first and the second surface fastener portions 22a, 22b are closely contacted with the side wall surface of the fastener holding portion 15a. Therefore, penetration of the foam resin material to the engaging region 26 of the first and the second surface fastener portions 22a, 22b beyond the first barrier portions 27 to the third barrier portion 29 can be prevented.

Accordingly, in Embodiment 3, a cushion body that the molded surface fastener 3 is fixed at a predetermined position of the groove portion for fixing the skin material in a state that the engaging elements 25 of the first and the second surface fastener portions 22a, 22b are exposed can be stably manufactured, similar to the case in Embodiment 1. Further, thus manufactured cushion body of Embodiment 3 can have a similar effect to that of the cushion body 10 manufactured in the above-mentioned Embodiment 1.

Embodiment 4

Figure 15:
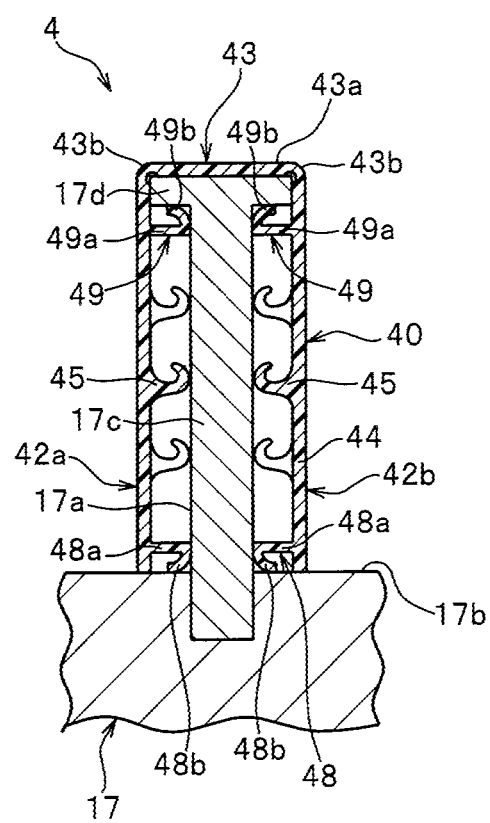
FIG. 15 is a cross-sectional view illustrating a state that a molded surface fastener according to Embodiment 4 of the present invention is held at a fastener holding portion of a molding die.

FIG. 15 shows a cross-sectional view illustrating a state that a molded surface fastener according to Embodiment 4 is held at a fastener holding portion of a molding die.

The molded surface fastener 4 of Embodiment 4 is manufactured by molding thermoplastic resin using a die wheel. However, in the molded surface fastener 4 of Embodiment 4, magnetic particles are not mixed in the thermoplastic resin, unlike the cases of the above-mentioned Embodiments 1 to 3. Therefore, strength of the molded surface fastener 4 can be more enhanced and a production cost of the molded surface fastener 4 can be more reduced than the cases in which the magnetic particles are mixed in the thermoplastic resin.

The molded surface fastener 4 of Embodiment 4 has a plurality of surface fastener members 40 disposed in a length direction and a connecting portion, not shown in the drawing, formed integrally with the surface fastener members 40 and connecting the respective surface fastener members 40. The each surface fastener member 40 has a pair of left and right first second surface fastener portions 42a, 42b and a foldable piece portion 43 disposed between the pair of the first and the second surface fastener portions 42a, 42b.

The first and the second surface fastener portions 42a, 42b of Embodiment 4 have a symmetrical shape each other about a center part of the foldable piece portion 43 in a width direction. The first surface fastener portion 42a disposed at a left side end portion of the foldable piece portion 43 has a flat plate-shaped substrate portion 44, a plurality of hook-shaped engaging elements 45 standing on an upper surface of the substrate portion 44 (first surface) and forming an engaging region, a pair of first barrier portions, which is not shown, standing along a width direction on an upper surface at a front end edge portion and a rear end edge portion of the substrate portion 44 between which the engaging region is disposed, second barrier portion 48 standing along a length direction on an end edge portion on an opposite side of a side of the foldable piece portion 43 of the substrate portion 44 and third barrier portion 49 standing along a length direction on an end edge portion on a side of the foldable piece portion 43 of the substrate portion 44.

The pair of the first barrier portions of Embodiment 4 stand on an upper surface at a front end edge portion and a rear end edge portion of the substrate portion 44, and each first barrier portion is configured of a single lateral wall body continuing in a width direction. In this case, the lateral wall body constituting the first barrier portion has a constant height dimension from the substrate portion 44, and the height dimension of the lateral wall body is set as same as a height dimension of the engaging element 45.

The second barrier portion 48 of Embodiment 4 has a single first vertical wall body 48a continuing along a length direction and a first elastic piece portion 48b curving and extending from a top end portion 17d of the first vertical wall body 48a toward an outside which is an opposite side of a side of the engaging region. A height dimension of the first vertical wall body 48a from the substrate portion 44 is set as a constant same dimension as the height dimension of the engaging element 45. The first elastic piece portion 48b is disposed so as to slope down from the top end portion 17d of the first vertical wall body 48a toward an outside, and is configured to be elastically deformable with respect to the first vertical wall body 48a in an approaching or separating direction.

Third barrier portion 49 of Embodiment 4 has a single second vertical wall body 49a continuing along a length direction and a second elastic piece portion 49b curving and extending from the top end portion 17d of the second vertical wall body 49a toward a side of the foldable piece portion 43. A height dimension of the second vertical wall body 49a from the substrate portion 44 is a constant same dimension as the height dimension of the engaging element 45. The second elastic piece portion 49b is disposed to slope down from the top end portion 17d of the second vertical wall body 49a to the side of the foldable piece portion 43, and elastically deformable with respect to the second vertical wall body 49a in an approaching or separating direction.

The foldable piece portion 43 of Embodiment 4 has a flat plate-shaped base portion 43a and a hinge portion 43b disposed at an end edge portion of the base portion 43a on a side of the first and the second surface fastener portions 42a, 42b, and the foldable piece portion 43 is connected to the first and the second surface fastener portions 42a, 42b via the hinge portion 43b. In the foldable piece portion 43, a connecting portion, which is not shown, connecting adjacent surface fastener portions 40, is integrally formed.

The cushion body to which the molded surface fastener 4 is integrated can be manufactured by injecting the foam resin material to the cavity space of the molding die 17 in a state that the molded surface fastener 4 of Embodiment 4 is held at the fastener holding portion 17a of the molding die 17, as shown in FIG. 15, and perform foam molding.

As mentioned above, magnetic particles are not contained in the molded surface fastener 4 of Embodiment 4. Therefore, the molded surface fastener 4 is held at the fastener holding portion 17a of the molding die 17 not by using a magnetic force, as in the above-mentioned Embodiments 1 to 3, but the molded surface fastener 4 is held at the fastener holding portion 17a of the molding die 17 by fitting the first and the second surface fastener portions 42a, 42b of the molded surface fastener 4 to the fastener holding portion 17a of the molding die 17.

Specifically, in Embodiment 4, the fastener holding portion 17a for holding the molded surface fastener 4 at the time of foam molding and for forming the groove portion for fixing the skin material of the cushion body is disposed in the molding die 17 which molds the cushion body, and the fastener holding portion 17a is projected in a cavity space from the cavity surface 17b of the molding die 17 forming a surface of the cushion body.

The fastener holding portion 17a of the molding die 17 in Embodiment 4 has, unlike the cases of Embodiments 1 to 3, a small support post portion 17c having a small width dimension and a top end portion 17d disposed at a top end of the support post portion 17c so that a cross section of the projected portion from the cavity surface 17b is formed as a substantially T-shape.

A fitting groove portion which can fit the first and the second fastener portions 42a, 42b is provided between the cavity surface 17b of the molding die 17 forming the surface of the cushion body in the left and right side wall portions of the fastener holding portion 17a and the top end portion 17d of the fastener holding portion 17a so as to accommodate the hook-shaped engaging elements 45 and the first to the third barrier portions 48, 49 of the first and the second surface fastener portions 42a, 42b in the molded surface fastener 4.

Therefore, in the fastener holding portion 17a of Embodiment 4, the top end surface of the fastener holding portion 17a serves as a first holding portion holding the foldable piece portion 43 of the molded surface fastener 4, and the left and right fitting groove portions provided at the fastener holding portion 17a serve as second holding portions holding the first and the second surface fastener portions 42a, 42b of the molded surface fastener 4.

When the molded surface fastener 4 of Embodiment 4 is held at the fastener holding portion 17a of the molding die 17, first, the base portion 43a of the foldable piece portion 43 is moved closer to the top end surface of the fastener holding portion 17a and is set to a position of the top end surface.

Next, the first and the second surface fastener portions 42a, 42b of the molded surface fastener 4 placed on the top end surface of the fastener holding portion 17a are folded with respect to the base portion 43a of the foldable piece portion 43 centering the hinge portion 43b of the foldable piece portion 43 so as to approach the fastener holding portion 17a, and the first and the second surface fastener portions 42a, 42b are pushed in the fastener holding portion 17a so that the hook-shaped engaging elements 45 and the first to the third barrier portions 48, 49 of the first and the second surface fastener portions 42a, 42b are accommodated in the fitting groove portions of the fastener holding portion 17a.

At this time, first and second elastic piece portions 48b, 49b respectively provided in the first and the second surface fastener portions 42a, 42b are elastically deforming and pushed in the fitting groove portions of the fastener holding portion 17a, and the first elastic piece portion 48b is pressed against a bottom surface of the top end portion of the fastener holding portion 17a as well as the second elastic piece portion 49b is pressed against the cavity surface 17b of the molding die 17 forming the surface of the cushion body. As a result, the first and the second surface fastener portions 42a, 42b are fitted in the fitting groove portions of the fastener holding portion 17a, in a state that respective upper surfaces of the hook-shaped engaging elements 45 and the first to the third barrier portions 48,49 of the first and the second surface fastener portions 42a, 42b are closely contacted with the support post portion 17c of the fastener holding portion 17a, and the molded surface fastener 4 is held in a predetermined close contact state at a predetermined position of the fastener holding portion 17a.

After the molded surface fastener 4 of Embodiment 4 is held at the fastener holding portion 17a of the molding die 17, the foam resin material is injected to the molding die 17 to perform foam molding. Thereby, the cushion body in which the molded surface fastener 4 is fixed to a predetermined position of the groove portion for fixing the skin material in a state that the engaging elements 45 of the first and the second surface fastener portions 42a, 42b are exposed can be stably manufactured. Thus manufactured cushion body of Embodiment 4 can obtain a similar effect to that of the cushion body 10 manufactured according to the above-mentioned Embodiment 1.

Embodiment 5

Figure 16:
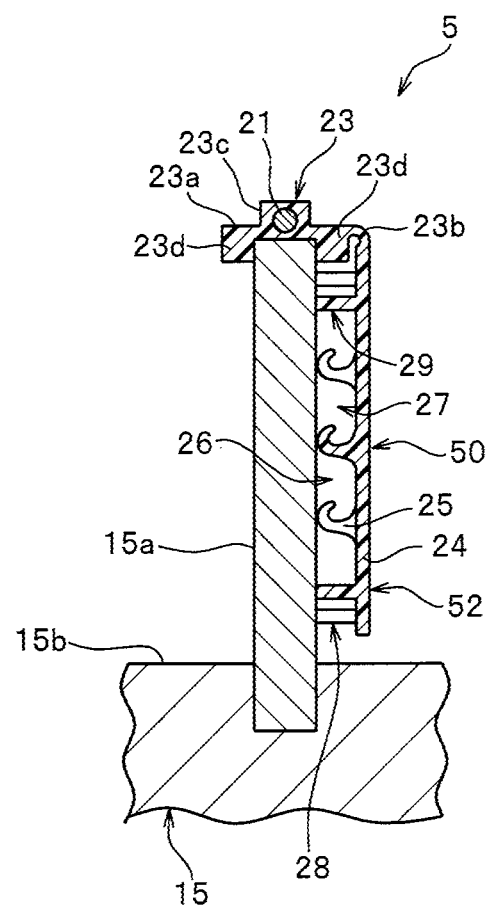
FIG. 16 is a cross-sectional view illustrating a state that a molded surface fastener according to Embodiment 5 of the present invention is held at a fastener holding portion of a molding die.

FIG. 16 shows a cross-sectional view illustrating a state that a molded surface fastener according to Embodiment 5 is held at a fastener holding portion of a molding die.

The molded surface fastener 5 according to Embodiment 5 is manufactured by molding a material in which magnetic particles are mixed in thermoplastic resin using a die wheel. Further, the molded surface fastener 5 of Embodiment 5 has a plurality of surface fastener members 50 and a connecting member 21 fixed to the respective surface fastener members 50, and the plurality of surface fastener members 50 are connected with each other by the connecting member 21.

The molded surface fastener 5 of Embodiment 5 has a structure that the second surface fastener portion 22b and the hinge portion 23b on a side of the second surface fastener portion 22b in the foldable piece portion 23 are removed from each surface fastener member 20 of the molded surface fastener 2 of the above-mentioned Embodiment 2.

Specifically, each surface fastener member 50 of Embodiment 5 has a single surface fastener portion 52 and the foldable piece portion 23 extending in a width direction from one end edge portion in a width direction of the surface fastener portion 52, and the surface fastener portion 52 itself is configured similar to the first surface fastener portion 22a of Embodiment 1.

That is, the surface fastener portion 52 of Embodiment 5 has a flat plate-shaped substrate portion 24, a plurality of hook-shaped engaging elements 25 standing on an upper surface of the substrate portion 24 and forming an engaging region 26, a pair of first barrier portions 27 standing along a width direction on an upper surface at a front end edge portion and a rear end edge portion of the substrate portion 24, second barrier portion 28 standing along a length direction at an end edge portion on an opposite side of a side of the foldable piece portion 23 of the substrate portion 24 and third barrier portion 29 standing along a length direction at an end edge portion on a side of the foldable piece portion 23 of the substrate portion 24.

The foldable piece portion 23 of Embodiment 5 has a flat plate-shaped base portion 23a, a hinge portion 23b disposed at the base portion 23a at an end edge portion on a side of the first surface fastener portion 22a, a fixing portion 23c disposed on a lower surface side of the base portion 23a and fixing the connecting member 21 and a pair of projected portions for positioning 23d projected on an upper surface of the foldable piece portion 23.

When foam molding of a cushion body is performed in a state that the molded surface fastener 5 of Embodiment 5 is held at the fastener holding portion 15a, first, the base portion 23a of the foldable piece portion 23 of the molded surface fastener 5 is set by moving closer to a top end surface of the fastener holding portion 15a. At the time, since the pair of projected portions for positioning 23d are disposed at the foldable piece portion 23 of the molded surface fastener 5, the foldable piece portion 23 of the molded surface fastener 5 is placed on the fastener holding portion 15a so that the top end portion of the fastener holding portion 15a is fitted between the pair of the projected portions 23d. Therefore, positioning of the molded surface fastener 5 with respect to the fastener holding portion 15a can be stably and certainly performed.

After the foldable piece portion 23 of the molded surface fastener 5 is placed on the fastener holding portion 15a, the surface fastener portion 52 of the molded surface fastener 5 in which the magnetic particles are mixed is attracted to a magnet of the fastener holding portion 15a.

Thus, it is automatically folded to approach the fastener holding portion 15a with respect to the base portion 23a of the foldable piece portion 23 about the hinge portion 23b of the foldable piece portion 23, and is attracted and fixed to the side wall surfaces of the fastener holding portion 15a.

Therefore, the molded surface fastener 5 of Embodiment 5 is held at the fastener holding portion 15a of the molding die 15 in a predetermined close contact state at a predetermined position. Since the molded surface fastener 5 of Embodiment 5 is held at the fastener holding portion 15a as the above, respective upper surfaces of the first barrier portions 27 to the third barrier portion 29 of the surface fastener portion 52 are closely contacted with the side wall surfaces of the fastener holding portion 15a, and formation of a gap through which the foam resin material can pass between these upper surfaces and the side wall surfaces of the fastener holding portion 15a can be prevented.

After the molded surface fastener 5 is held at the fastener holding portion 15a of the molding die 15, the cushion body in which the groove portion for fixing the skin material is formed on a surface at a predetermined position, and the molded surface fastener 5 of Embodiment 5 is integrated to the groove portion for fixing the skin material can be manufactured by injecting the foam resin material into the molding die 15, and performing the foam molding.

In this case, the foldable piece portion 23 of the molded surface fastener 5 is disposed at a groove bottom portion of the groove portion for fixing the skin material. Also, the surface fastener portion 52 of the molded surface fastener 5 is disposed on one of the left and right side wall portions facing each other in the groove portion for fixing the skin material in a state that a plurality of engaging elements 25 are exposed. Therefore, the cushion body manufactured in Embodiment 5 can obtain a similar effect to the cushion body 10 manufactured in the above-mentioned Embodiment 1.

Figure 17:
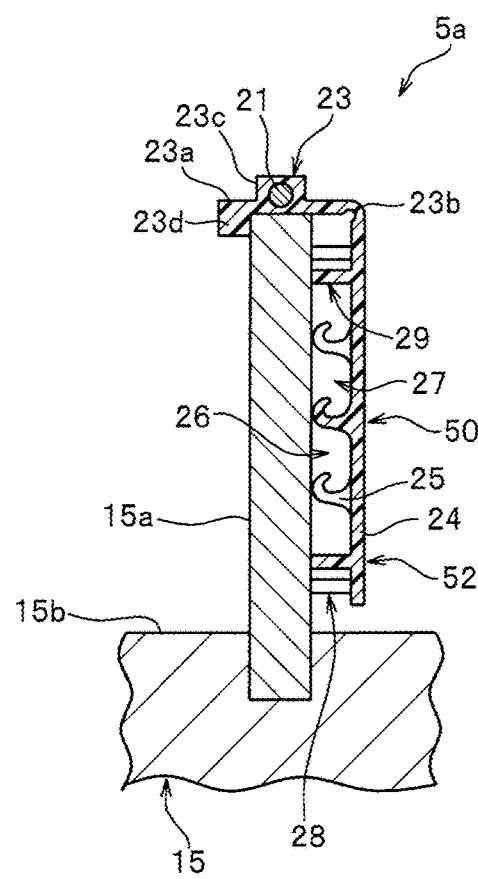
FIG. 17 is a cross-sectional view of illustrating a state that a molded surface fastener according to a modification embodiment of Embodiment 5 is held at a fastener holding portion of a molding die.

It should be noted that in the present invention, the molded surface fastener 5a can be configured so that a projected portion for positioning 23d disposed on a side of the surface fastener portion 52 among the pair of the projected portions for positioning 23d is removed from the foldable piece portion 23 of the molded surface fastener 5 of Embodiment 5, as shown in FIG. 17 as a modification embodiment of Embodiment 5.

Even for such a molded surface fastener 5a in which one projected portion for positioning 23d disposed on a side of the surface fastener portion 52 is removed, a positioning of the molded surface fastener 5a with respect to the fastener holding portion 15a can be easily determined by using one projected portion for positioning 23d disposed at the foldable piece portion 23, when the base portion 23a of the foldable piece portion 23 of the molded surface fastener 5a is placed on the top end surface of the fastener holding portion 15a. Thus, the molded surface fastener 5a can be held in a predetermined close contact state at a predetermined position of the fastener holding portion 15a of the molding die 15.

Embodiment 6

Figure 18:
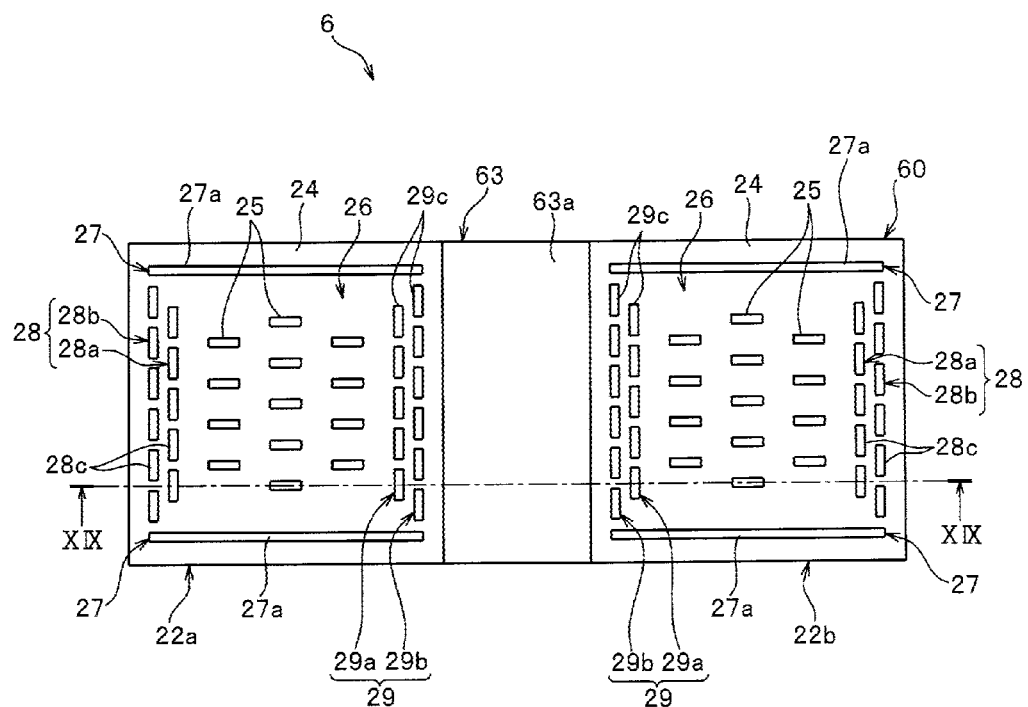
FIG. 18 is a plan view illustrating a molded surface fastener according to Embodiment 6 of the present invention.
Figure 19:
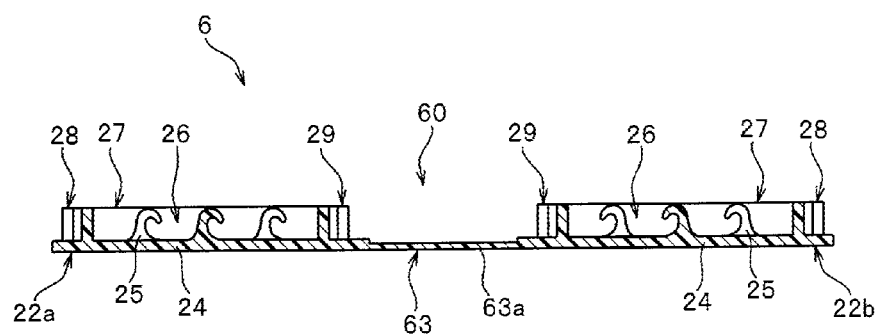
FIG. 19 is a cross-sectional view along the line XIX-XIX in FIG. 18.

FIG. 18 shows a plan view illustrating a molded surface fastener according to Embodiment 6, and FIG. 19 shows a cross-sectional view along the line XIX-XIX in FIG. 18.

The molded surface fastener 6 of Embodiment 6 is manufactured by molding a material in which magnetic particles are mixed in thermoplastic resin using a die wheel. Further, the molded surface fastener 6 of Embodiment 6 is constituted of a single surface fastener member 60 having a pair of left and right first and second surface fastener portions 22a, 22b and a foldable piece portion 63 disposed between the pair of first and second surface fastener portions 22a, 22b.

The first and the second surface fastener portions 22a, 22b of Embodiment 6 is constituted similar to the first and the second surface fastener portions 22a, 22b of the above-mentioned Embodiment 1. The foldable piece portion 63 of Embodiment 6 is constituted of a base portion 63a having a smaller constant thickness dimension than that of the substrate portion 24 of the first and the second surface fastener portions 22a, 22b so as to have a constant flexibility in an entire width direction.

In the molded surface fastener 6 of Embodiment 6, the foldable piece portion 63 disposed between the first and the second surface fastener portions 22a, 22b can be curved to fold at any part of the foldable piece portion 63. Therefore, when the molded surface fastener 6 of Embodiment 6 is held at the fastener holding portion 15a provided in the molding die 15 of the cushion body, even if a dimension of the fastener holding portion 15a in a width direction is smaller than a case of the above-mentioned Embodiment 1, for example, the molded surface fastener 6 can be appropriately held at the fastener holding portion 15a in a predetermined close contact state at a predetermined position by appropriately curving the foldable piece portion 63 of the molded surface fastener 6 in accordance with a width dimension of the fastener holding portion 15a.

When the molded surface fastener 6 of Embodiment 6 is used, the top end surface of the fastener holding portion 15a disposed at the molding die 15 can be formed as a curved surface shape curved in U-shape, instead of a flat surface as in the above-mentioned Embodiment 1.

After the molded surface fastener of Embodiment 6 is held at the fastener holding portion 15a of the molding die 15, foam molding is performed by injecting the foam resin material to the molding die 15, and a cushion body in which the molded surface fastener 6 is fixed at a predetermined position of the groove portion for fixing the skin material in a state that a plurality of engaging elements 25 disposed at the first and the second surface fastener portions 22a, 22b are exposed. Further, thus manufactured cushion body of Embodiment 6 can obtain a similar effect to that of the cushion body 10 manufactured in the above-mentioned Embodiment 1.

Embodiment 7

Figure 20:
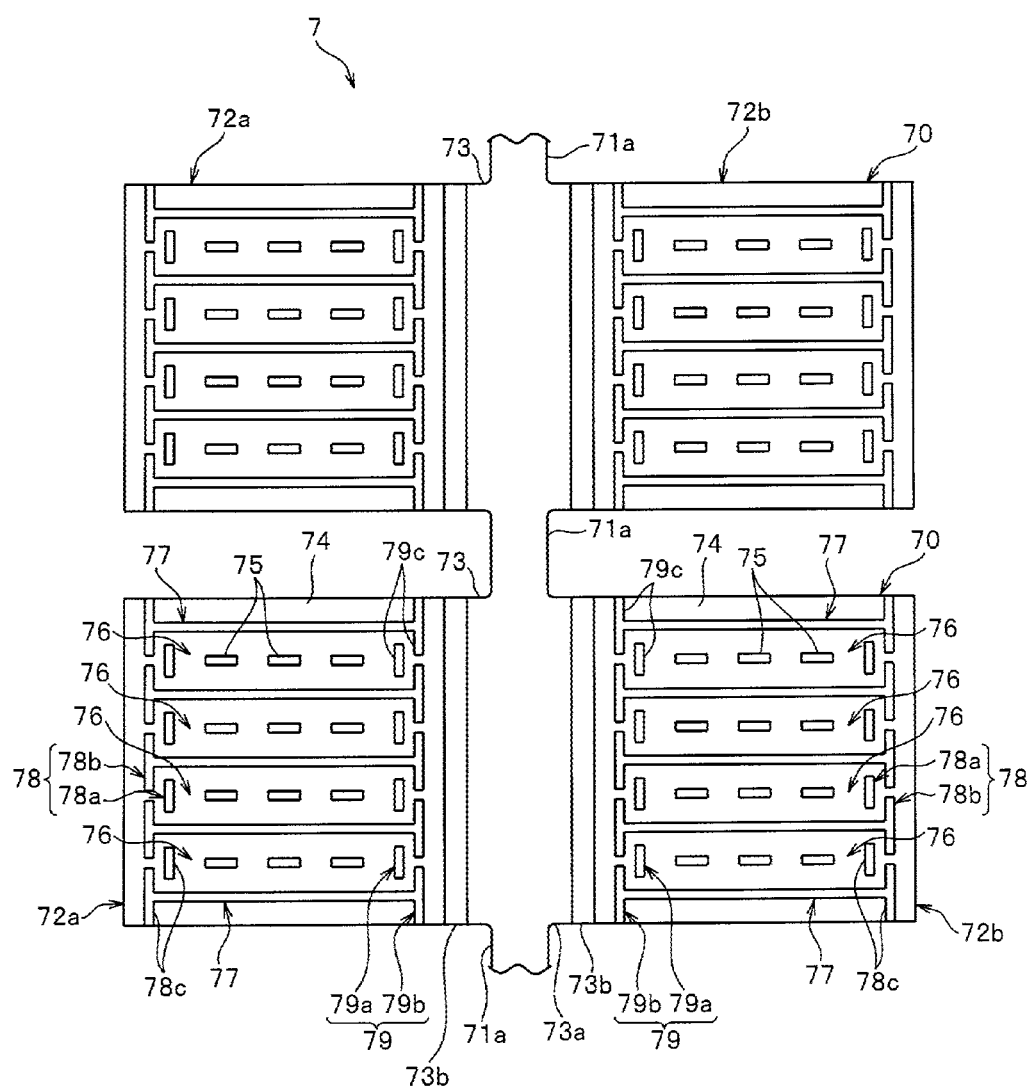
FIG. 20 is a plan view illustrating a molded surface fastener according to Embodiment 7 of the present invention.

FIG. 20 shows a plan view illustrating a molded surface fastener according to Embodiment 7.

The molded surface fastener 7 of Embodiment 7 is manufactured by molding a material in which magnetic particles are mixed in thermoplastic resin using a die wheel. Further, the molded surface fastener 7 of Embodiment 7 has a plurality of surface fastener members 70 disposed along a length direction and a connecting portion 71a formed integrally with the surface fastener members 70 and connecting between respective surface fastener members 70. The each surface fastener member 70 has a pair of left and right first and second surface fastener portions 72a, 72b and a foldable piece portion 73 disposed between the pair of the first and the second surface fastener portions 72a, 72b.

In Embodiment 7, the first and the second surface fastener portions 72a, 72b have a symmetrical shape each other about a center part of the foldable piece portion 73 in a width direction. The first surface fastener portion 72a disposed at a left side end portion of the foldable piece portion 73 has a flat plate-shaped substrate portion 74, a plurality of hook-shaped engaging elements 75 standing on an upper surface of the substrate portion 74 and forming an engaging region 76, a plurality of first barrier portions 77 standing along a width direction on an upper surface of the substrate portion 74, second barrier portion 78 standing along a length direction at an end edge portion of an opposite side of a side of the foldable piece portion 73 of the substrate portion 74 and third barrier portion 79 standing along a length direction at an end edge portion of a side of the foldable piece portion 73 of the substrate portion 74.

The substrate portion 74 of the first surface fastener portion 72a has a thin plate-shaped having a constant plate thickness. Each hook-shaped engaging element 75 of Embodiment 7 has a same shape as the hook-shaped engaging element 25 of the above-mentioned Embodiment 1, and is formed so that a hook portion of a top end portion extends to a side of the foldable piece portion 73. The engaging elements 75 of Embodiment 7 are disposed in three rows along a width direction between the second barrier portion 78 and the third barrier portion 79, and four sets of the rows of the engaging elements 75 in the width direction are formed on an upper surface of the substrate portion 74. Further, in Embodiment 7, engaging regions 76 are formed on each row of the engaging elements 75 lined in the width direction.

In the first surface fastener portion 72a of Embodiment 7, five first barrier portions 77 stand on an upper surface of the substrate portion 74, and each first barrier portion 77 is formed of a single lateral wall body continuously formed along a width direction having a constant height dimension same as a height dimension of the engaging element 75. In this case, each lateral wall body of the first barrier portion 77 is disposed so that rows of the engaging elements 75 lined in a width direction are disposed between adjacent lateral wall bodies. That is, each engaging region 76 constituting of the engaging elements 75 lined in a width direction, respectively, is placed to be between the lateral wall bodies of the first barrier portions 77. Further, each lateral wall body of Embodiment 7 connects between a vertical wall body 78c of an outer side barrier row 78b, to be described later of the second barrier portion 78, and a vertical wall body 79c of an outer side barrier row 79b, to be described later of the third barrier portion 79.

The second barrier portion 78 and the third barrier portion 79 of the first surface fastener portion 72a of Embodiment 7 stand on an upper surface at a left side end edge portion (an end edge portion on an opposite side of a side of the foldable piece portion 73) of the substrate portion 74 and an upper surface at a right side end edge portion (an end edge portion on a side of the foldable piece portion 73) of the substrate portion 74 along a length direction, respectively.

The second barrier portion 78 and the third barrier portion 79 respectively have two rows of an inner side barrier row 78a, 79a and an outer side barrier row 78b, 79b lining in a width direction. The inner side barrier row 78a, 79a is disposed between the outer side barrier row 78b, 79b and the engaging region 76.

The inner side barrier row 78a, 79b is constituted of four vertical wall bodies 78c, 79c disposed along a length direction intermittently at a predetermined attaching pitch, and the outer side barrier row 78b, 79b is constituted of five vertical wall bodies 78c, 79c disposed along a length direction intermittently at a predetermined attaching pitch. In this case, the vertical wall bodies 78c, 79c of the inner side barrier row 78a, 79a and the vertical wall bodies 78c, 79c of the outer side barrier row 78b, 79b are disposed to be staggered each other by staggering the positions in the row direction (length direction).

In the second barrier portion 78 and the third barrier portion 79 of Embodiment 7, respective vertical wall bodies 78c, 79c disposed at the inner side barrier row 78a, 79a and the outer side barrier row 78b, 79b are formed to have a same shape and a same dimension each other. Further, a height dimension of the respective vertical wall bodies 78c, 79c is set to be same as height dimensions of the engaging elements 75 and the lateral wall bodies of the first barrier portions 77.

The foldable piece portion 73 of Embodiment 7 has a flat plate-shaped base portion 73a having a certain degree of rigidity and a hinge portion 73b disposed at an end edge portion of a side of the first and the second surface fastener portions 72a, 72b of the foldable piece portion 73 and having higher flexibility than the base portion 73a. The foldable piece portion 73 is connected to the first and the second surface fastener portions 72a, 72b via the hinge portion 73b. At front and rear end edge portions of the base portion 73a, a connecting portion 71a connecting adjacent surface fastener members 70 is integrally formed.

By foam molding the cushion body in a state that the molded surface fastener 7 of Embodiment 7 is held at the fastener holding portion 15a of the molding die 15, as mentioned in Embodiment 1, a cushion body in which the molded surface fastener 7 is fixed at a predetermined position of the groove portion for fixing the skin material in a state that a plurality of the engaging elements 75 disposed at the first and the second surface fastener portions 72a, 72b are exposed can be stably manufactured. The cushion body of Embodiment 7 thus manufactured also can obtain a similar effect to that of the cushion body 10 as in the above-mentioned Embodiment 1.

Further, in order to obtain the molded surface fastener 7 having a desired length dimension according to Embodiment 7, it is also possible not only to cut the molded surface fastener 7 at a part of the connecting portion 71a in a width direction, but also to cut the molded surface fastener 7 at a part of the surface fastener member 70 in a width direction.

That is, in the molded surface fastener 7 of Embodiment 7, the plurality of first barrier portions 77 are disposed at the first and the second surface fastener portions 72a, 72b of respective surface fastener members 70. Therefore, even if cutting operation is performed at the part of the surface fastener member 70 in order to obtain the molded surface fastener 7 having a desired length dimension, penetration of the foam resin material to the engaging region 76 at the time of foam molding of the cushion body can be effectively prevented by the first barrier portions 77 adjacent to a cut end edge formed by the cutting operation in the cut surface fastener member 70.

Accordingly, in the cushion body to which the molded surface fastener 7 is integrated, it is possible to expose not only the engaging element 75 of the surface fastener member 70 to which the cutting operation is not performed, but also the engaging element 75 of the surface fastener member 70 which was cut by the above cutting operation. Therefore, the cushion body in which an engaging force of the engaging region 76 near the cut end edge of the molded surface fastener 7 of Embodiment 7 can be stably obtained can be manufactured.

Embodiment 8

Figure 21:
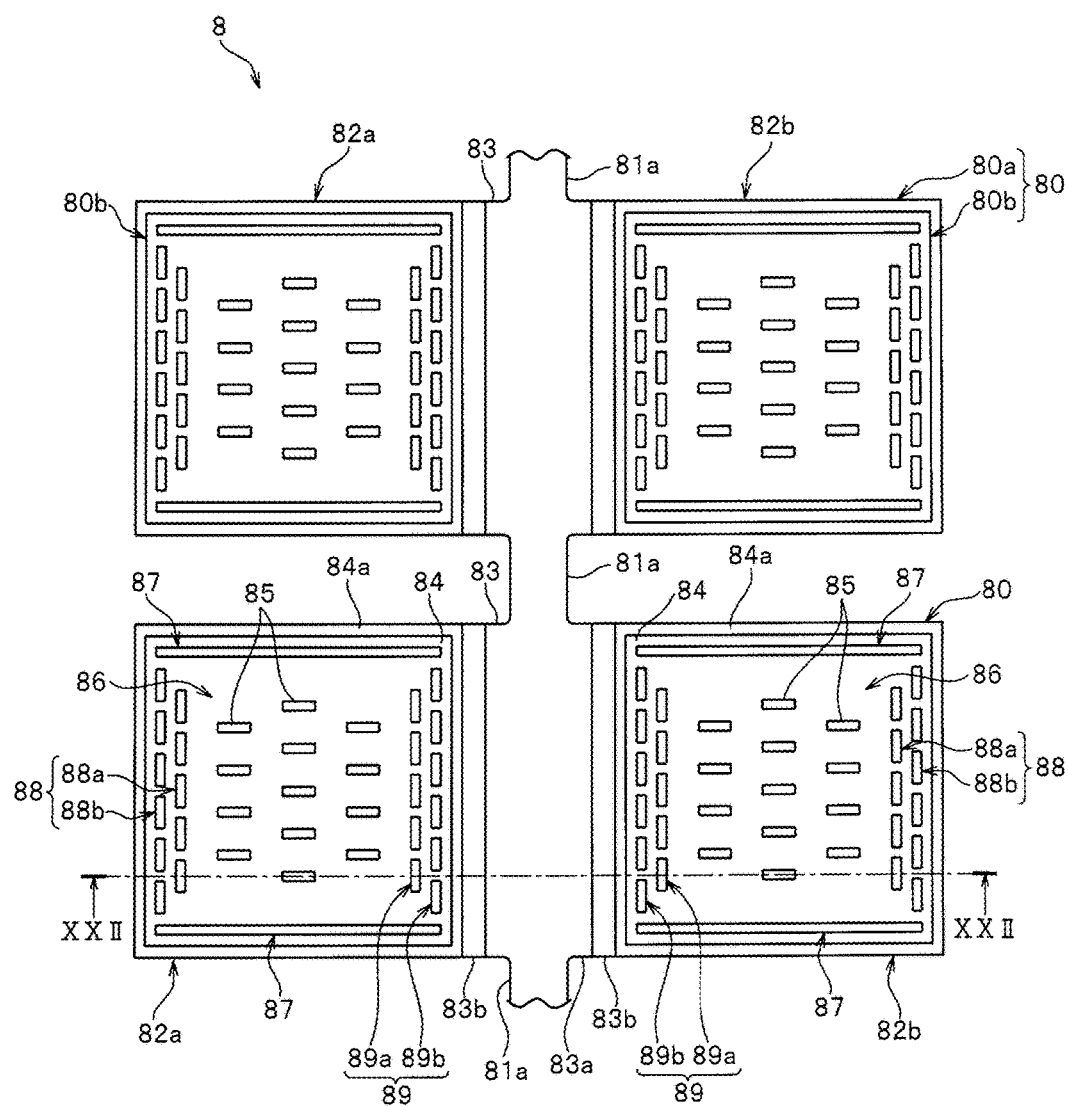
FIG. 21 is a plan view illustrating a molded surface fastener according to Embodiment 8 of the present invention.
Figure 22:
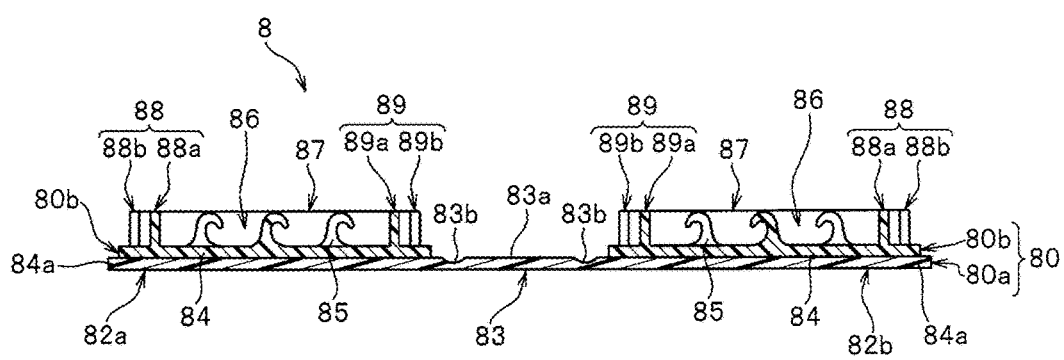
FIG. 22 is a cross-sectional view along the line XXII-XXII of FIG. 21.

FIG. 21 shows a plan view illustrating a molded surface fastener according to Embodiment 8, and FIG. 22 shows a cross-sectional view along the line XXII-XXII in FIG. 21.

The molded surface fastener 8 of Embodiment 8 has a plurality of surface fastener members 80 disposed along a length direction and a connecting portion 81*a* formed integrally with the surface fastener members 80 and connecting between the respective surface fastener members 80. The each surface fastener member 80 has a pair of left and right first and second surface fastener portions 82*a*, 82*b* and a foldable piece portion 83 disposed between the pair of the first and the second surface fastener portions 82*a*, 82*b*.

The molded surface fastener 8 of Embodiment 8 is manufactured by, as mentioned later, fixing a second molding member 80*b* having an engaging region 86 and obtained by molding a material in which magnetic particles are mixed in thermoplastic resin in a separate molding process from a molding process of a first molding member 80*a* to the first molding member 80*a* having the foldable piece portion 83 and a later-described flat plate-shaped supporting portion 84*a* of the first and the second surface fastener portions 82*a*, 82*b* and obtained by molding a material in which magnetic particles are mixed in thermoplastic resin.

In Embodiment 8, the first and the second surface fastener portions 82*a*, 82*b* have a symmetrical shape each other about a center part of the foldable piece portion in a width direction. Further, the first surface fastener portion 82*a* disposed at a left side edge portion of the foldable piece portion 83 is configured by fixing by bonding or welding the second molding member 80*b* forming the engaging region 86 to an upper surface of a flat plate-shaped supporting portion 84*a* formed integrally with the foldable piece portion 83. The second surface fastener portion 82*b* is configured by fixing the second molding member 80*b* to an upper surface of the flat plate-shaped supporting portion 84*a* integrally molded with the foldable piece portion 83 in a reverse direction of the first surface fastener portion 82*a* in left and right direction.

In this case, the second molding member 80*b* has a flat plate-shaped substrate portion 84, a plurality of hook-shaped engaging elements 85 standing on an upper surface of the substrate portion 84 and forming an engaging region 86, a pair of first barrier portions 87 standing along a width direction on an upper surface of the substrate portion 84 so that the engaging region 86 is disposed between them, second barrier portion 88 standing along a length direction on an opposite end edge portion of a side of the foldable piece portion 83 of the substrate portion 84 and third barrier portion 89 standing along a length direction at an end edge portion on a side of the foldable piece portion 83 of the substrate portion 84.

Each hook-shaped engaging element 85 in the second molding member 80*b* has a rising portion rising from the substrate portion 84 and a hook portion extending from an upper end of the rising portion in one direction in a reverse J-shape or a reverse L-shape. Each first barrier portion 87 disposed at the second molding member 80*b* is constituted of a single lateral wall body continuously formed having a constant height dimension along a width direction, and the height dimension of the lateral wall body is same as a height dimension of the hook-shaped engaging element 85.

The second barrier portion 88 and the third barrier portion 89 disposed at the second molding member 80*b* respectively stand on an upper surface of the substrate portion 84 along a length direction. The second barrier portion 88 and the third barrier portion 89 respectively have two rows of an inner side barrier row 88*a*, 89*a* and an outer side barrier row 88*b*, 89*b* in line in a width direction.

The inner side barrier row 88*a*, 89*a* is disposed between the outer side barrier row 88*b* and the engaging region 86. Further, respective vertical wall bodies disposed at the inner barrier row 88*a*, 89*a* and the outer barrier row 88*b*, 89*b* are formed to have a same shape and a dimension each other. A height dimension of each vertical wall body is the same dimension as height dimensions of the engaging element 85 and the lateral wall body of the first barrier portions 87.

The foldable piece portion 83 of Embodiment 8 has a flat plate-shaped base portion 83*a* and a hinge portion 83*b* disposed at an end edge portion on a side of the first and the second surface fastener portions 82*a*, 82*b* of the foldable piece portion 83 and having higher flexibility than the base portion 83*a*. The foldable piece portion 83 is connected to the supporting portion 84*a* of the first and the second surface fastener portions 82*a*, 82*b* via the hinge portion 83*b*. At a front and a rear end edge portions of the base portion 83*a*, a connecting portion 81*a* connecting adjacent surface fastener members 80 is integrally formed.

Regarding Embodiment 8, it is also possible that the foldable piece portion 83 is configured without the above-mentioned hinge portion 83*b* in a case that the first molding member 80*a* having the foldable piece portion 83 is formed of synthetic resin (or a compound of synthetic resin and elastomer) having appropriate flexibility.

When the molded surface fastener 8 of Embodiment 8 having such a structure is manufactured, first, the first molding member 80*a* having the foldable piece portion 83, the supporting portion 84*a* of the first and the second surface fastener portions 82*a*, 82*b* and the connecting portion 81*a* is molded using a material in which magnetic particles are mixed in thermoplastic resin. Then, the second molding member 80*b* having the above structure is formed in a separate molding process from the one of the first molding member 80*a* using a material in which magnetic particles are mixed in thermoplastic resin. In this case, same synthetic resins or compounds may be employed as materials of the first molding member 80*a* and the second molding member 80*b*, or different synthetic resins or compounds may be employed.

After the first molding member 80*a* and a plurality of the second molding members 80*b* are manufactured, the second molding members 80*b* are respectively fixed to an upper surface of respective left and right supporting portions 84*a* disposed at the first molding member 80*a* using a bonding means or a welding means. Thus, the molded surface fastener 8 of Embodiment 8 shown in FIGS. 21 and 22 is manufactured.

By performing foam molding of the cushion body in a state that the molded surface fastener 8 of Embodiment 8 is held at the fastener holding portion 15*a* of the molding die 15, as in the above-mentioned Embodiment 1, the cushion body in which the molded surface fastener 8 is fixed at a predetermined position of the groove portion for fixing the skin material in a state that a plurality of engaging elements 85 disposed at the first and the second surface fastener portions 82*a*, 82*b* are exposed can be stably manufactured. Thus manufactured cushion body of Embodiment 8 can also obtain a similar effect to the cushion body manufactured as in the above-mentioned Embodiment 1.

Embodiment 9

Figure 23:
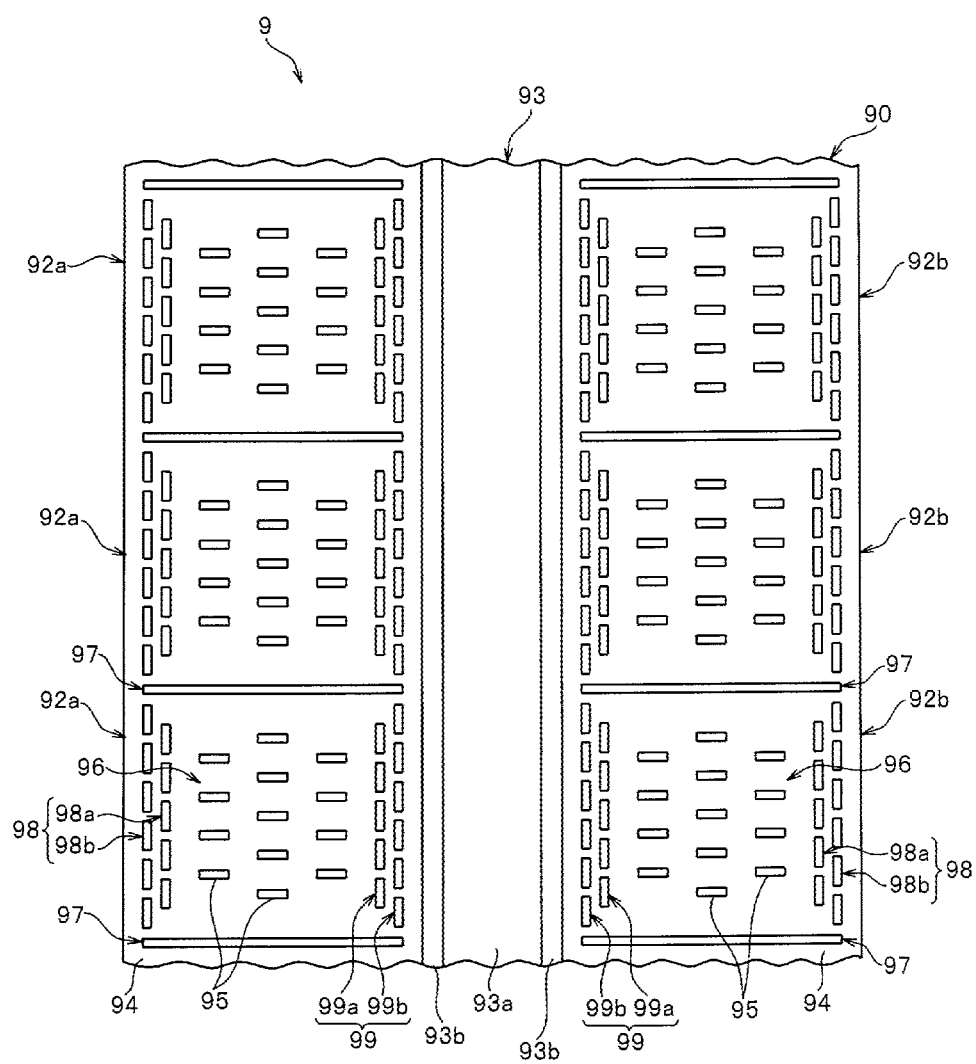
FIG. 23 is a plan view illustrating a molded surface fastener according to Embodiment 9 of the present invention.

FIG. 23 shows a plan view illustrating a molded surface fastener according to Embodiment 9.

In the molded surface fastener 9 of Embodiment 9, a plurality of surface fastener members 90 are connected continuously in a length direction, and configured without having the connecting member 21 or the connecting portions 21a, 31a, 71a or 81a as in the above-mentioned Embodiments 1 to 8. The molded surface fastener 9 of Embodiment 9 is manufactured by molding a material in which magnetic particles are mixed in thermoplastic resin using a die wheel.

Each surface fastener member 90 of the molded surface fastener 9 in Embodiment 9 has a pair of left and right first and second surface fastener portions 92a, 92b and a foldable piece portion 93 disposed between the pair of the first and the second surface fastener portions 92a, 92b.

The first and the second surface fastener portions 92a, 92b of Embodiment 9 have a symmetrical shape each other about a center part of the foldable piece portion 93 in a width direction. The first surface fastener portion 92a disposed at a left side edge portion of the foldable piece portion 93 has a flat plate-shaped substrate portion 94, a plurality of hook-shaped engaging elements 95 standing on an upper surface of the substrate portion 94 and forming an engaging region 96, first barrier portions 97 standing on an upper surface of the substrate portion 94 along a width direction, second barrier portion 98 standing at an opposite end edge portion of a side of the foldable piece portion 93 of the substrate portion 94 along a length direction and third barrier portion 99 standing at an end edge portion on a side of the foldable piece portion 93 of the substrate portion 94 along a length direction.

The substrate portion 94 of the first surface fastener portion 92a has a thin flat plate shape having a constant thickness. Each hook-shaped engaging element 95 of Embodiment 9 has a same shape as the hook-shaped engaging element 25 of the above-mentioned Embodiment 1, and a hook portion at a top end portion extends in a curved manner only to a side of the foldable piece portion 93.

The first barrier portions 97 of Embodiment 9 are disposed at a boundary portion with an adjacent surface fastener member 90 along a width direction so that the engaging region 96 of each surface fastener member 90 are between the first barrier portions 97. In other words, in Embodiment 9, a pair of the first barrier portions 97 are provided between which the engaging region 96 is disposed in each surface fastener member 90, and the first barrier portion 97 of each surface fastener member 90 also serves as a first barrier portion 97 of another surface fastener member 90 adjacent thereto. Each first barrier portion 97 of Embodiment 9 is formed of a single lateral wall body continuously formed along a width direction and having a constant height dimension as same as the height dimension of the engaging element 95.

The second barrier portion 98 and the third barrier portion 99 of the first surface fastener portion 92a of Embodiment 9 stand on an upper surface of an end edge portion of an opposite side of a side of the foldable piece portion 93 of the substrate portion 94 and an upper surface of an end edge portion on a side of the foldable piece portion 93 of the substrate portion 94, respectively in a length direction. The second barrier portion 98 and the third barrier portion 99 respectively have two rows of an inner side barrier row 98a, 99a and an outer side barrier row 98b, 99b disposed along a length direction so as to line in a width direction.

The inner side barrier row 98a, 99a is disposed between the outer side barrier row 98b, 99b and the engaging region 96. The inner side barrier row 98a, 99a are formed of four vertical wall bodies disposed along a length direction intermittently at a predetermined attaching pitch. The outer side barrier row 98b, 99b is formed of five vertical wall bodies disposed along a length direction intermittently at a predetermined attaching pitch. In this case, the vertical wall bodies of the inner side barrier row 98a, 99a and the vertical wall bodies of the outer side barrier row 98b, 99b are disposed to be staggered each other by staggering the positions in the row direction (length direction).

In the second barrier portion 98 and third barrier portion 99 of Embodiment 9, respective vertical wall bodies disposed at the inner barrier row 98a, 99a and the outer barrier row 98b, 99b are formed to have a same shape and a dimension each other. A height dimension of each vertical wall body is the same dimension as height dimensions of the engaging element 95 and the lateral wall body of the first barrier portions 97.

The foldable piece portion 93 of Embodiment 9 has a flat plate-shaped base portion 93a having a certain degree of rigidity and a hinge portion 93b disposed at an end edge portion on a side of the first and the second surface fastener portions 92a, 92b of the base portion 93a and having higher flexibility than the base portion 93a. The foldable piece portion 93 is connected to the first and the second surface fastener portions 92a, 92b via the hinge portion 93b.

By performing foam molding of the cushion body in a state that the molded surface fastener 9 of Embodiment 9 is held at the fastener holding portion 15a of the molding die 15, as in the above-mentioned Embodiment 1, the cushion body in which the molded surface fastener 9 is fixed at a predetermined position of the groove portion for fixing the skin material in a state that a plurality of engaging elements 95 disposed at the first and the second surface fastener portions 92a, 92b are exposed can be stably manufactured. Thus manufactured cushion body of Embodiment 9 can also obtain a similar effect to the cushion body 10 manufactured as in the above-mentioned Embodiment 1.

REFERENCE SIGNS LIST 1, 1a, 1b: MOLDED SURFACE FASTENER
2, 2a: MOLDED SURFACE FASTENER
3, 4: MOLDED SURFACE FASTENER
5, 5a: MOLDED SURFACE FASTENER
6, 7: MOLDED SURFACE FASTENER
8, 9: MOLDED SURFACE FASTENER
10: CUSHION BODY
10a: GROOVE PORTION FOR FIXING A SKIN MATERIAL
11: SKIN MATERIAL
12: ENGAGED INSERTION PIECE PORTION
13: FEMALE ENGAGING MEMBER
13a: LOOP-SHAPED ENGAGING ELEMENT
15: MOLDING DIE
15a: FASTENER HOLDING PORTION
15b: CAVITY SURFACE (INNER WALL SURFACE)
15c: SPACE PORTION
16: MOLDING DIE
16a: FASTENER HOLDING PORTION
16b: CAVITY SURFACE
16c: RAISED PORTION
17: MOLDING DIE
17a: FASTENER HOLDING PORTION
17b: CAVITY SURFACE
17c: SUPPORTING POST PORTION
17d: TOP END PORTION
19: MIXING REGION
20: SURFACE FASTENER MEMBER
21: CONNECTING MEMBER

21a: CONNECTING PORTION
22a: FIRST SURFACE FASTENER PORTION
22b: SECOND SURFACE FASTENER PORTION
23: FOLDABLE PIECE PORTION
23a: BASE PORTION
23b: HINGE PORTION
23c: FIXING PORTION
23d: PROJECTED PORTION
24: SUBSTRATE PORTION
24a: FIN PIECE PORTION
25: ENGAGING ELEMENT (HOOK-SHAPED ENGAGING ELEMENT)
26: ENGAGING REGION
27: FIRST BARRIER PORTION
27a: LATERAL WALL BODY
28: SECOND BARRIER PORTION
28a: INNER SIDE BARRIER ROW
28b: OUTER SIDE BARRIER ROW
28c: VERTICAL WALL BODY
29: THIRD BARRIER PORTION
29a: INNSER SIDE BARRIER ROW
29b: OUTER SIDE BARRIER ROW
29c: VERTICAL WALL BODY
30: SURFACE FASTENER MEMBER
31a: CONNECTING PORTION
33: FOLDABLE PIECE PORTION
33a: BASE PORTION
33b: HINGE PORTION
33c: PENETRATION HOLE
40: SURFACE FASTENER MEMBER
42a: FIRST SURFACE FASTENER PORTION
42b: SECOND SURFACE FASTENER PORTION
43: FOLDABLE PIECE PORTION
43a: BASE PORTION
43b: HINGE PORTION
44: SUBSTRATE PORTION
45: ENGAGING ELEMENT (HOOK-SHAPED ENGAGING ELEMENT)
48: SECOND BARRIER PORTION
48a: FIRST VERTICAL WALL BODY
48b: FIRST ELASTIC PIECE PORTION
49: THIRD BARRIER PORTION
49a: SECOND VERTICAL WALL BODY
49b: SECOND ELASTIC PIECE PORTION
50: SURFACE FASTENER MEMBER
52: SURFACE FASTENER PORTION
60: SURFACE FASTENER MEMBER
63: FOLDABLE PIECE PORTION
63a: BASE PORTION
70: SURFACE FASTENER MEMBER
71a: CONNECTING PORTION
72a: FIRST SURFACE FASTENER PORTION
72b: SECOND SURFACE FASTENER PORTION
73: FOLDABLE PIECE PORTION
73a: BASE PORTION
73b: HINGE PORTION
74: SUBSTRATE PORTION
75: ENGAGING ELEMENT
76: ENGAGING REGION
77: FIRST BARRIER PORTION
78: SECOND BARRIER PORTION
78a: INNER SIDE BARRIER ROW
78b: OUTER SIDE BARRIER ROW
78c: VERTICAL WALL BODY
79: THIRD BARRIER PORTION
79a: INNER SIDE BARRIER ROW
79b: OUTER SIDE BARRIER ROW
79c: VERTICAL WALL BODY
80: SURFACE FASTENER MEMBER
80a: FIRST MOLDING MEMBER
80b: SECOND MOLDING MEMBER
81a: CONNECTING PORTION
82a: FIRST SURFACE FASTENER PORTION
82b: SECOND SURFACE FASTENER PORTION
83: FOLDABLE PIECE PORTION
83a: BASE PORTION
83b: HINGE PORTION
84: SUBSTRATE PORTION
84a: SUPPORTING PORTION
85: ENGAGING ELEMENT
86: ENGAGING REGION
87: FIRST BARRIER PORTION
88: SECOND BARRIER PORTION
88a: INNER SIDE BARRIER PORTION
88b: OUTER SIDE BARRIER PORTION
89: THIRD BARRIER PORTION
89a: INNER SIDE BARRIER ROW
89b: OUTER SIDE BARRIER ROW
90: SURFACE FASTENER MEMBER
92a: FIRST SURFACE FASTENER PORTION
92b: SECOND SURFACE FASTENER PORTION
93: FOLDABLE PIECE PORTION
93a: BASE PORTION
93b: HINGE PORTION
94: SUBSTRATE PORTION
95: ENGAGING ELEMENT
96: ENGAGING REGION
97: FIRST BARRIER PORTION
98: SECOND BARRIER PORTION
98a: INNER SIDE BARRIER ROW
98b: OUTER SIDE BARRIER ROW
99: THIRD BARRIER PORTION
99a: INNER SIDE BARRIER ROW
99b: OUTER SIDE BARRIER ROW

The invention claimed is:

1. A molded surface fastener that is configured to be integrated to a groove portion for fixing a skin material provided on a surface portion of a cushion body along a length direction of the groove portion at a time of foam molding of the cushion body,
comprising at least one surface fastener portion in which an engaging region is formed of a plurality of hook-shaped engaging elements standing on a first surface of a flat plate-shaped substrate portion wherein:
a foldable piece portion extends from one of left and right end edge portions in a width direction which is perpendicular to the length direction of the surface fastener portion,
at least a part of the foldable piece portion has flexibility which is foldable with respect to the surface fastener portion,
the surface fastener portion has a pair of first barrier portions standing along a width direction at both end portions in a length direction of the substrate portion and between which the engaging region is disposed, and a second barrier portion standing along the length direction at an end edge portion of an opposite side of a side of the foldable piece portion in the substrate portion,
each hook-shaped engaging element has a rising portion standing from the substrate portion and a hook portion extending in the width direction from an upper end of the rising portion, and the hook portion extends only toward a side of the foldable piece portion.

2. The molded surface fastener according to claim 1, wherein:
the surface fastener portion forms a first surface fastener portion, and
a second surface fastener portion having a symmetrical shape with respect to the first surface fastener portion about the foldable piece portion is disposed at an end edge portion on an opposite side of a side of the first surface fastener portion of the foldable piece portion.

3. The molded surface fastener according to claim 1, wherein:
at least one among the pair of the first barrier portions and the second barrier portion has two or more barrier rows, and
in each barrier row, a plurality of wall bodies are disposed intermittently in a row, and
the wall bodies of each barrier row are disposed to be staggered each other by staggering positions in a row direction with respect to the wall bodies of the adjacent barrier row.

4. The molded surface fastener according claim 1, wherein:
the foldable piece portion includes a flat plate-shaped base portion and a hinge portion disposed between the base portion and the surface fastener portion and having higher flexibility than the base portion.

5. The molded surface fastener according to claim 1, wherein the whole foldable piece portion has constant flexibility.

6. The molded surface fastener according to claim 1, wherein:
a magnetic material is mixed in or attached to at least a part of an end edge portion on an opposite side of a side of the foldable piece portion of the surface fastener portion.

7. The molded surface fastener according to claim 1, wherein:
at least one third barrier portion stands along a length direction at an end edge portion on a side of the foldable piece portion in the surface fastener portion.

8. The molded surface fastener according to claim 1, wherein:
a plurality of surface fastener members provided with the surface fastener portion and the foldable piece portion are connected along a fastener length direction via a connecting member or a connecting portion.

9. The molded surface fastener according to claim 1, wherein:
a projected portion for positioning for a molding die of the cushion body is provided on the first surface of the foldable piece portion.

10. A cushion body in which the molded surface fastener according to claim 1 is integrated to the groove portion for fixing a skin material in a state that the engaging region is exposed.

11. A cushion body in which a groove portion for fixing a skin material is provided on a surface portion, and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, wherein:
the molded surface fastener includes a foldable piece portion bending and extending from an end edge portion on a side of a groove bottom portion of the groove portion in the surface fastener portion and integrated to the groove bottom portion, and
the surface fastener portion includes a pair of first barrier portions standing along the groove depth direction at both end portions in a length direction of the substrate portion between which the engaging region is disposed and a second barrier portion standing along the length direction at an end edge portion on a side of a groove opening portion of the groove portion of the substrate portion.

12. The cushion body according to claim 11, wherein:
each hook-shaped engaging element includes a rising portion standing from the substrate portion and a hook portion extending in the width direction from an upper end of the rising portion, and
the hook portion extends only toward a side of the foldable piece portion.

13. The cushion body according to claim 11, wherein:
the surface fastener portion forms a first surface fastener portion, and
a second surface fastener portion having a symmetrical shape with the first surface fastener portion about the foldable piece portion is disposed at an end edge portion on an opposite side of a side of the first surface fastener portion of the foldable piece portion, and integrated to another side wall portion of the groove portion.

14. A method for manufacturing a cushion body in which a groove portion for fixing a skin material is provided on a surface portion, and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, the method including:
molding the molded surface fastener in a shape that a foldable piece portion extends from one of left and right end edge portions in a width direction which is perpendicular to a length direction of the surface fastener portion, at least a part of the foldable piece portion has flexibility which is foldable with respect to the surface fastener portion, and the surface fastener portion has a pair of first barrier portions standing along a width direction at both end portions in a length direction of the substrate portion and between which the engaging region is disposed and second barrier portion standing along the length direction at an end edge portion of the substrate portion on an opposite side of a side of the foldable piece portion,
preparing a molding die in which a fastener holding portion including a first holding portion holding the foldable piece portion of the molded surface fastener and second holding portions holding the surface fastener portions of the molded surface fastener are projected from an inner wall surface forming a surface of the cushion body;
placing the foldable piece portion of the molded surface fastener on the first holding portion of the molding die, and attaching the molded surface fastener to the fastener holding portion by closely contacting the surface fastener portion of the molded surface fastener to the second holding portions of the molding die (in a bent manner with respect to the foldable piece portion, and
performing foam molding in a cavity of the molding die to which the molded surface fastener is attached.

15. The method for manufacturing a cushion body according to claim 14 including:
containing or attaching a magnetic material in at least a part of the molded surface fastener, forming the fastener holding portion of the molding die of a magnet, and attaching the molded surface fastener to the fastener holding portion by magnetic attraction.

16. A molding die configured for foam molding of a cushion body in which a groove portion for fixing a skin material is provided on a surface portion and a molded surface fastener having at least one surface fastener portion in which an engaging region is formed of a plurality of hook-shaped engaging elements standing on a first surface of a flat plate-shaped substrate portion is integrated to at least a side wall portion of the groove portion in a state that the engaging region is exposed, the molding die comprising:
an inner wall surface configured for forming a surface of the cushion body, and
a fastener holding portion projected from the inner wall surface,
wherein the fastener holding portion includes a first holding portion configured for closely contacting a foldable piece portion which extends from one of left and right end edge portions in a width direction of the at least one surface fastener portion in the molded surface fastener, and at least one second holding portion configured for holding the at least one surface fastener portion of the molded surface fastener, and
the first holding portion is disposed at a tip end portion of the fastener holding portion, and the at least one second holding portion is disposed on at least one side wall portion of the fastener holding portion between the inner wall surface and the first holding portion.

17. The molding die according to claim 16, wherein:
the fastener holding portion is formed of a magnet,
the first holding portion and the at least one second holding portion have a magnetic attractive surface which can be attracted by magnetic force, and the magnetic attractive surface of the first holding portion and
the magnetic attractive surfaces of the at least one second holding portion are formed as a flat surface.

* * * * *

UNITED STATES PATENT AND TRADEMARK OFFICE
CERTIFICATE OF CORRECTION

PATENT NO. : 10,426,231 B2
APPLICATION NO. : 15/119208
DATED : October 1, 2019
INVENTOR(S) : Ryuichi Murasaki et al.

Page 1 of 1

It is certified that error appears in the above-identified patent and that said Letters Patent is hereby corrected as shown below:

In the Claims

In Column 49, Line 23, in Claim 4, after "according" insert -- to --.

In Column 50, Line 64, in Claim 14, delete "(in" and insert -- in --, therefor.

Signed and Sealed this
Twenty-sixth Day of November, 2019

Andrei Iancu
*Director of the United States Patent and Trademark Office*